(12) United States Patent
Machida

(10) Patent No.: US 10,698,189 B2
(45) Date of Patent: Jun. 30, 2020

(54) VARIABLE MAGNIFICATION OPTICAL SYSTEM, OPTICAL APPARATUS, AND VARIABLE MAGNIFICATION OPTICAL SYSTEM MANUFACTURING METHOD

(71) Applicant: Nikon Corporation, Minato-ku, Tokyo (JP)

(72) Inventor: Kosuke Machida, Tokyo (JP)

(73) Assignee: Nikon Corporation, Tokyo (JP)

( * ) Notice: Subject to any disclaimer, the term of this patent is extended or adjusted under 35 U.S.C. 154(b) by 441 days.

(21) Appl. No.: 15/539,055

(22) PCT Filed: Dec. 25, 2015

(86) PCT No.: PCT/JP2015/086371
§ 371 (c)(1),
(2) Date: Nov. 11, 2017

(87) PCT Pub. No.: WO2016/104771
PCT Pub. Date: Jun. 30, 2016

(65) Prior Publication Data
US 2018/0052311 A1    Feb. 22, 2018

(30) Foreign Application Priority Data
Dec. 26, 2014   (JP) ................................. 2014-266038

(51) Int. Cl.
*G02B 15/173* (2006.01)
*G02B 15/20* (2006.01)
(Continued)

(52) U.S. Cl.
CPC ........... *G02B 15/173* (2013.01); *G02B 13/18* (2013.01); *G02B 15/177* (2013.01); *G02B 15/20* (2013.01); *G02B 27/646* (2013.01)

(58) Field of Classification Search
CPC .... G02B 15/173; G02B 13/18; G02B 15/177; G02B 27/64; G02B 27/646; G02B 15/00;
(Continued)

(56) References Cited

U.S. PATENT DOCUMENTS

| | | |
|---|---|---|
| 4,749,268 A | 6/1988 | Moskovich et al. |
| 4,842,386 A | 6/1989 | Kitagishi et al. |

(Continued)

FOREIGN PATENT DOCUMENTS

| | | |
|---|---|---|
| JP | 60-242416 A | 12/1985 |
| JP | 61-138913 A | 6/1986 |

(Continued)

OTHER PUBLICATIONS

Office Action dated Dec. 29, 2018, in Chinese Patent Application No. 201580074940.8.

(Continued)

*Primary Examiner* — Jade R Chwasz
*Assistant Examiner* — Rahman Abdur
(74) *Attorney, Agent, or Firm* — SGPatents PLLC

(57) ABSTRACT

A variable magnification optical system includes: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, wherein when varying magnification, the first lens group moves with respect to an image plane, the distance between the first lens group and the negative lens group is changed, and the distance between the negative lens group and the positive lens group is changed, wherein when (Continued)

focusing, the distance between the focusing group and a lens arranged at a position to face an object-side of the focusing group is changed, and the distance between the focusing group and a lens arranged at a position to face an image-side of the focusing group is changed, wherein the focusing group is constituted by a single lens component, wherein the positive lens group is constituted by a front group having a positive refractive power and a rear group having a negative refractive power, and the distance between the front group and the rear group is the largest air distance among air distances in the positive lens group, and wherein the rear group is constituted by two lens components.

20 Claims, 15 Drawing Sheets

(51) Int. Cl.
*G02B 13/18* (2006.01)
*G02B 15/177* (2006.01)
*G02B 27/64* (2006.01)

(58) Field of Classification Search
CPC ........ G02B 15/02; G02B 15/20; G02B 15/22; G02B 15/28; G02B 15/1421; G02B 15/144; G02B 15/1441
USPC ....... 359/660, 432, 422, 686, 687, 688, 771, 359/772, 774, 775
See application file for complete search history.

(56) References Cited

U.S. PATENT DOCUMENTS

| | | |
|---|---|---|
| 5,054,898 A | 10/1991 | Kitagishi et al. |
| 2015/0253551 A1 | 9/2015 | Obama et al. |
| 2018/0052311 A1 | 2/2018 | Machida |

FOREIGN PATENT DOCUMENTS

| | | | |
|---|---|---|---|
| JP | 61-172110 A | | 8/1986 |
| JP | 62-000911 A | | 1/1987 |
| JP | 04-223428 A | | 8/1992 |
| JP | 04-293007 A | | 10/1992 |
| JP | 2012-181525 A | | 9/2012 |
| JP | 2012181525 A | * | 9/2012 |
| JP | 2012-212088 A | | 11/2012 |
| JP | 2014-085491 A | | 5/2014 |
| WO | WO 2016/104771 A1 | | 6/2016 |
| WO | WO 2017/047760 A1 | | 3/2017 |

OTHER PUBLICATIONS

Office Action dated Feb. 5, 2019, in Japanese Patent Application No. 2018-000235.
International Search Report from International Patent Application No. PCT/JP2015/086371, dated Mar. 29, 2016.
Written Opinion of the International Searching Authority from International Patent Application No. PCT/JP2015/086371, dated Mar. 29, 2016.
Office Action dated Sep. 26, 2017 in Japanese Patent Application No. 2016-566556.

* cited by examiner

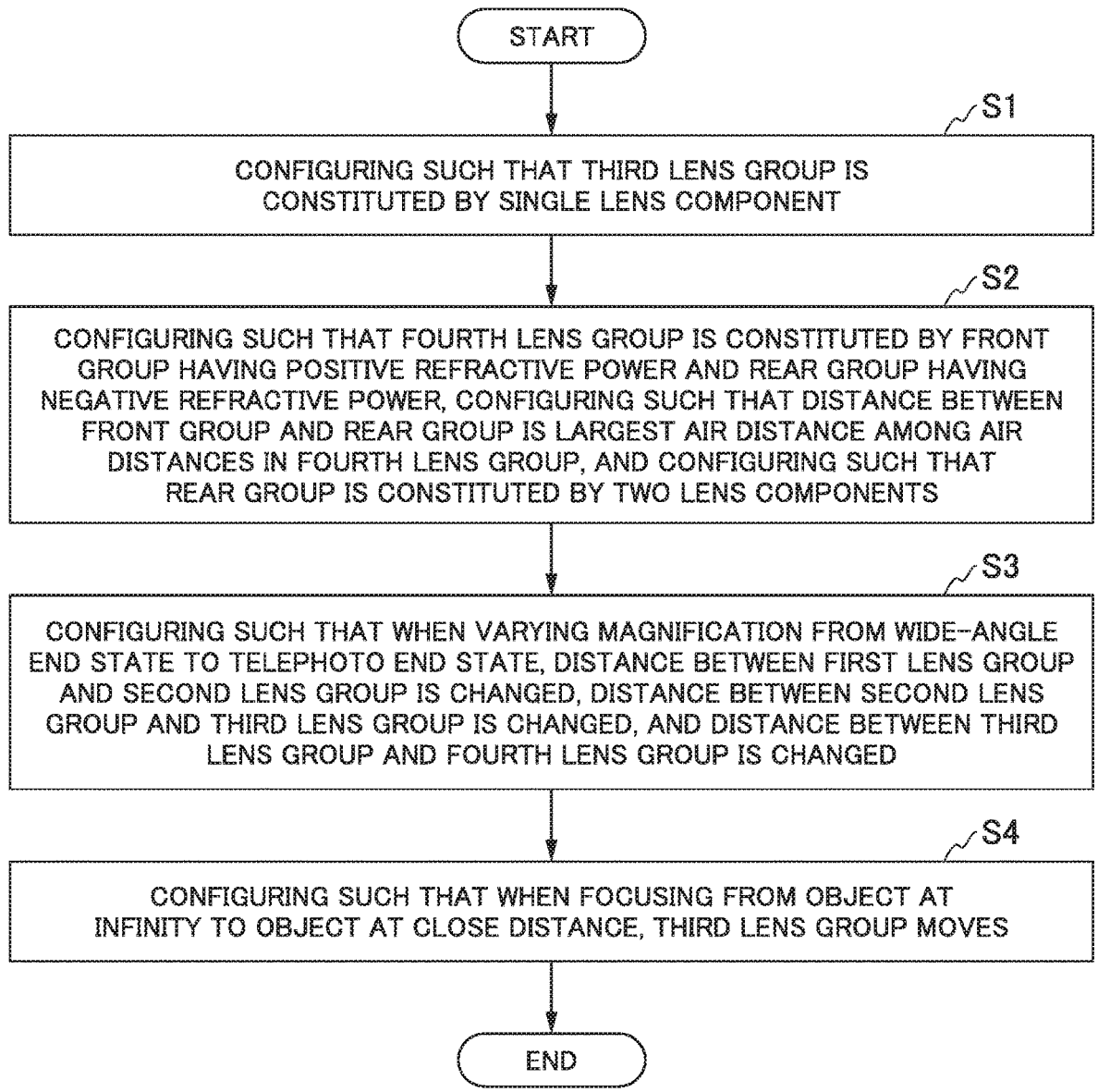

VARIABLE MAGNIFICATION OPTICAL SYSTEM, OPTICAL APPARATUS, AND VARIABLE MAGNIFICATION OPTICAL SYSTEM MANUFACTURING METHOD

TECHNICAL FIELD

The present invention relates to a variable magnification optical system which is suitable for photographic cameras, electronic still cameras, video cameras, and the like, an optical apparatus which has a variable magnification optical system, and a variable magnification optical system manufacturing method.

Priority is claimed on Japanese Patent Application No. 2014-266038, filed on Dec. 26, 2014, the contents of which are incorporated herein by reference.

TECHNICAL BACKGROUND

In the related art, variable magnification optical systems which are suitable for photographic cameras, electronic still cameras, video cameras, and the like have been proposed (for example, refer to Patent Document 1).

RELATED ART DOCUMENTS

Patent Document

Patent Document 1: Japanese Patent Application, Publication No. H4-293007

SUMMARY OF INVENTION

Technical Problem

However, in the variable magnification optical systems of the related art, a focusing lens group (focusing group) is not made sufficiently lightweight.

Solution to Problem

A variable magnification optical system according to an aspect of the present invention includes: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, wherein when varying magnification, the first lens group moves with respect to an image plane, a distance between the first lens group and the negative lens group is changed, and a distance between the negative lens group and the positive lens group is changed, wherein when focusing, a distance between the focusing group and a lens arranged at a position to face an object-side of the focusing group is changed, and a distance between the focusing group and a lens arranged at a position to face an image-side of the focusing group is changed, wherein the focusing group is constituted by a single lens component, wherein the positive lens group is constituted by a front group having a positive refractive power and a rear group having a negative refractive power, and a distance between the front group and the rear group is the largest air distance among air distances in the positive lens group, and wherein the rear group is constituted by two lens components.

Another aspect of the present invention provides a variable magnification optical system, including: in order from an object along an optical axis, a first lens group having a positive refractive power; a second lens group having a negative refractive power; a third lens group having a positive refractive power; and a fourth lens group having a positive refractive power, wherein when varying magnification, a distance between the first lens group and the second lens group is changed, a distance between the second lens group and the third lens group is changed, and a distance between the third lens group and the fourth lens group is changed, wherein when focusing from an object at infinity to an object at a close distance, the third lens group moves, wherein the third lens group is constituted by a single lens component, wherein the fourth lens group is constituted by a front group having a positive refractive power and a rear group having a negative refractive power, and a distance between the front group and the rear group is the largest air distance among air distances in the fourth lens group, and wherein the rear group is constituted by two lens components.

Another aspect of the present invention provides an optical apparatus that includes the above variable magnification optical system.

A variable magnification optical system manufacturing method according to another aspect of the present invention is a manufacturing method of a variable magnification optical system, including: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, the method including: arranging, when varying magnification, such that the first lens group moves with respect to an image plane, a distance between the first lens group and the negative lens group is changed, and a distance between the negative lens group and the positive lens group is changed; and arranging, when focusing, such that a distance between the focusing group and a lens arranged at a position to face an object-side of the focusing group is changed, and a distance between the focusing group and a lens arranged at a position to face an image-side of the focusing group is changed, wherein the focusing group is constituted by a single lens component, wherein the positive lens group is constituted by a front group having a positive refractive power and a rear group having a negative refractive power, and a distance between the front group and the rear group is the largest air distance among air distances in the positive lens group, and wherein the rear group is constituted by two lens components.

Another aspect of the present invention provides a variable magnification optical system manufacturing method that is a manufacturing method of a variable magnification optical system, including: in order from an object along an optical axis, a first lens group having a positive refractive power; a second lens group having a negative refractive power; a third lens group having a positive refractive power; and a fourth lens group having a positive refractive power, the method including: configuring such that the third lens group is constituted by a single lens component; configuring such that the fourth lens group is constituted by a front group having a positive refractive power and a rear group having a negative refractive power; configuring such that a distance between the front group and the rear group is the largest air distance among air distances in the fourth lens group; configuring such that the rear group is constituted by two lens components; configuring such that when varying magnification, a distance between the first lens group and the second lens group is changed, a distance between the second lens group and the third lens group is changed, and a distance between the third lens group and the fourth lens group is changed; and configuring such that when focusing from an object at infinity to an object at a close distance, the third lens group moves.

BRIEF DESCRIPTION OF THE DRAWINGS

FIG. 15 is a view showing an outline of an example of a variable magnification optical system manufacturing method according to an embodiment.

DESCRIPTION OF EMBODIMENTS

Figure 1:
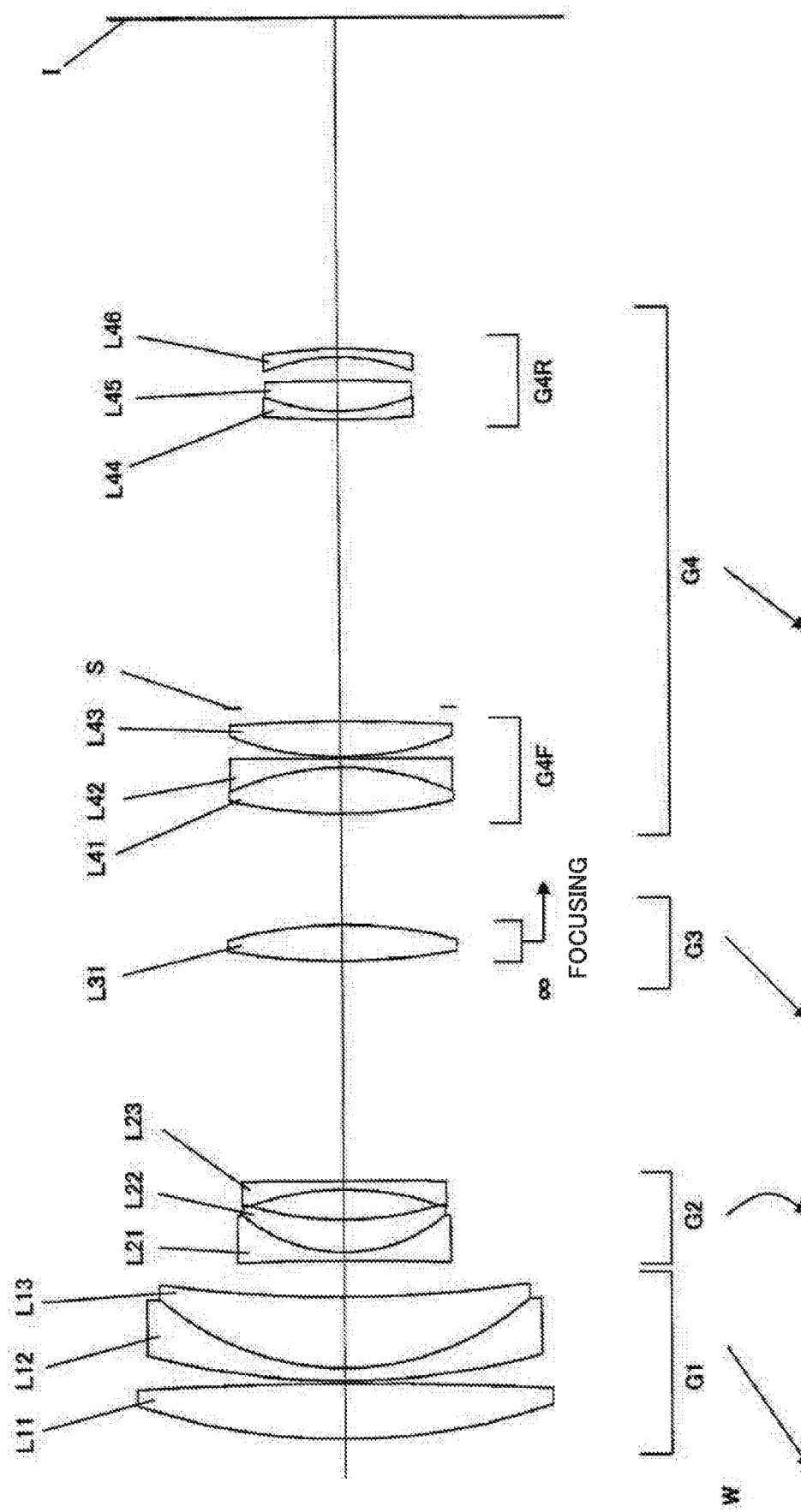
FIG. 1 is a cross-sectional view showing a configuration of a variable magnification optical system according to Example 1.

Hereinafter, a variable magnification optical system, an optical apparatus, and a variable magnification optical system manufacturing method are described. First, a variable magnification optical system is described.

In an embodiment, a variable magnification optical system includes: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, wherein when varying magnification, the first lens group moves with respect to an image plane, the distance between the first lens group and the negative lens group is changed, and the distance between the negative lens group and the positive lens group is changed. According to the configuration, it is possible to realize varying magnification and satisfactorily correct aberration when varying magnification. Further, when focusing, the distance between the focusing group and a lens arranged at a position to face an object-side of the focusing group is changed, and the distance between the focusing group and a lens arranged at a position to face an image-side of the focusing group is changed, and the focusing group is constituted by a single lens component. According to the configuration, it is possible to make the focusing group lightweight. Further, the positive lens group is constituted by a front group having a positive refractive power and a rear group having a negative refractive power, and the distance between the front group and the rear group is the largest air distance among air distances in the positive lens group. According to the configuration, it is possible to satisfactorily correct various aberrations including coma aberration. Further, the rear group is constituted by two lens components. According to the configuration, it is possible to effectively correct various aberrations including coma aberration.

In an alternative embodiment, a variable magnification optical system includes: in order from an object along an optical axis, a first lens group having a positive refractive power; a second lens group having a negative refractive power; a third lens group having a positive refractive power; and a fourth lens group having a positive refractive power, wherein when varying magnification, the distance between the first lens group and the second lens group is changed, the distance between the second lens group and the third lens group is changed, and the distance between the third lens group and the fourth lens group is changed.

According to the configuration, it is possible to realize varying magnification and satisfactorily correct aberration when varying magnification.

In the alternative embodiment, when focusing from an object at infinity to an object at a close distance, the third lens group moves, and the third lens group is constituted by a single lens component. According to the configuration, it is possible to make the focusing group lightweight. The lens component refers to a single lens or a cemented lens constituted by cementing two or more lenses.

In the alternative embodiment, the fourth lens group is constituted by a front group having a positive refractive power and a rear group having a negative refractive power, and the distance between the front group and the rear group is the largest air distance among air distances in the fourth lens group. According to the configuration, it is possible to satisfactorily correct various aberrations including coma aberration.

In the alternative embodiment, the rear group is constituted by two lens components. According to the configuration, it is possible to effectively correct various aberrations including coma aberration.

In the embodiments, in the variable magnification optical system, when varying magnification from a wide-angle end state to a telephoto end state, the first lens group can preferably move toward the object. According to such a configuration, it is possible to shorten the entire lens length in the wide-angle end state, and it is possible to realize downsizing of the variable magnification optical system.

In the embodiments, it can be preferable that a variable magnification optical system include: in order from an object along an optical axis, a first lens group having a positive refractive power; a second lens group having a negative refractive power; a third lens group having a positive refractive power; and a fourth lens group having a positive refractive power, wherein when varying magnification from the wide-angle end state to the telephoto end state, the distance between the first lens group and the second lens group is changed, the distance between the second lens group and the third lens group is changed, and the distance between the third lens group and the fourth lens group is increased. According to such a configuration, it is possible to satisfactorily correct aberration when varying magnification.

In the embodiments, the variable magnification optical system can preferably satisfy Conditional Expression (1) below.

$$0.4 < fF/(-fR) < 0.9 \tag{1}$$

where fF: a focal length of the front group, and fR: a focal length of the rear group.

Conditional Expression (1) is a conditional expression for defining a ratio of the focal length of the front group to the focal length of the rear group of the fourth lens group. When Conditional Expression (1) is satisfied, it is possible to satisfactorily correct various aberrations including coma aberration.

When the correspondence value of Conditional Expression (1) exceeds the upper limit value, the refractive power of the rear group becomes strong, and it becomes difficult to correct various aberrations including coma aberration. In order to reliably obtain the effect, the upper limit value of Conditional Expression (1) can be preferably 0.88. In order to further reliably obtain the effect, the upper limit value of Conditional Expression (1) can be preferably 0.86.

On the other hand, when the correspondence value of Conditional Expression (1) is smaller than the lower limit value, the refractive power of the front group becomes strong, and it becomes difficult to correct various aberrations including spherical aberration. In order to reliably obtain the effect, the lower limit value of Conditional Expression (1) can be preferably 0.5. In order to further reliably obtain the effect, the lower limit value of Conditional Expression (1) can be preferably 0.55.

In the embodiments, it can be preferable that the variable magnification optical system include: in order from an object along an optical axis, a first lens group having a positive refractive power; and a second lens group having a negative refractive power, wherein when varying magnification, the distance between the first lens group and the second lens group is changed, and wherein Conditional Expression (2) below is satisfied.

$$3.5 < f1/(-f2) < 6.5 \tag{2}$$

where f1: a focal length of the first lens group, and f2: a focal length of the second lens group (negative lens group).

Conditional Expression (2) is a conditional expression for defining a ratio of the focal length of the first lens group to the focal length of the second lens group (negative lens group). When Conditional Expression (2) is satisfied, it is possible to prevent variation of various aberrations including spherical aberration when varying magnification from a wide-angle end state to a telephoto end state.

When the correspondence value of Conditional Expression (2) exceeds the upper limit value, the refractive power of the second lens group becomes strong, and it becomes difficult to correct various aberrations including spherical aberration. In order to reliably obtain the effect, the upper limit value of Conditional Expression (2) can be preferably 5.8. In order to further reliably obtain the effect, the upper limit value of Conditional Expression (2) can be preferably 5.5.

On the other hand, when the correspondence value of Conditional Expression (2) is smaller than the lower limit value, the refractive power of the first lens group becomes strong, and it becomes difficult to correct various aberrations including spherical aberration. In order to reliably obtain the effect, the lower limit value of Conditional Expression (2) can be preferably 3.7. In order to further reliably obtain the effect, the lower limit value of Conditional Expression (2) can be preferably 4.1.

In the embodiments, it can be preferable that a variable magnification optical system include: in order from an object along an optical axis, a first lens group having a positive refractive power; a second lens group having a negative refractive power; a third lens group having a positive refractive power; and a fourth lens group having a positive refractive power, wherein when varying magnification, the distance between the first lens group and the second lens group is changed, the distance between the second lens group and the third lens group is changed, and the distance between the third lens group and the fourth lens group is changed, and wherein Conditional Expression (3) below is satisfied.

$$1.7 < f4/f3 < 2.4 \tag{3}$$

where f4: a focal length of the fourth lens group (positive lens group), and f3: a focal length of the third lens group (focusing group).

Conditional Expression (3) is a conditional expression for defining a ratio of the focal length of the fourth lens group (positive lens group) to the focal length of the third lens group (focusing group). When Conditional Expression (3) is satisfied, it is possible to prevent variation of various aberrations including spherical aberration when focusing from an object at infinity to an object at a close distance.

When the correspondence value of Conditional Expression (3) exceeds the upper limit value, the refractive power of the third lens group becomes strong, and it becomes difficult to correct various aberrations including spherical aberration when focusing from an object at infinity to an object at a close distance. In order to reliably obtain the effect, the upper limit value of Conditional Expression (3) can be preferably 2.3. In order to further reliably obtain the effect, the upper limit value of Conditional Expression (3) can be preferably 2.25.

On the other hand, when the correspondence value of Conditional Expression (3) is smaller than the lower limit value, the refractive power of the fourth lens group becomes strong, and it becomes difficult to correct various aberrations including coma aberration. In order to reliably obtain the effect, the lower limit value of Conditional Expression (3) can be preferably 1.8. In order to further reliably obtain the effect, the lower limit value of Conditional Expression (3) can be preferably 1.85.

In the embodiments, it can be preferable that a variable magnification optical system include: in order from an object along an optical axis, a first lens group having a positive refractive power; a second lens group having a negative refractive power; and a third lens group having a positive refractive power, wherein when varying magnification from a wide-angle end state to a telephoto end state, the distance between the first lens group and the second lens group is increased, and the distance between the second lens group and the third lens group is decreased. According to such a configuration, it is possible to ensure a variable magnification ratio of about four or more.

In the embodiments, the front group can preferably have a cemented lens. According to such a configuration, it is possible to effectively correct spherical aberration and chromatic aberration.

In the embodiments, it can be preferable that the front group have a cemented lens, the cemented lens be constituted by a lens component having a positive refractive power and a lens component having a negative refractive power, and Conditional Expression (4) below be satisfied.

$$0.70 < n1/n2 < 0.95 \quad (4)$$

where n1: a refractive index of the lens component having a positive refractive power, and n2: a refractive index of the lens component having a negative refractive power.

Conditional Expression (4) is a conditional expression for defining a ratio of the refractive index of the lens component having a positive refractive power to the refractive index of the lens component having a negative refractive power, the lens components constituting the cemented lens included in the front group of the fourth lens group. When Conditional Expression (4) is satisfied, it is possible to satisfactorily correct spherical aberration.

When the correspondence value of Conditional Expression (4) exceeds the upper limit value, the concave refractive power on a cemented surface of the lens component having a positive refractive power and the lens component having a negative refractive power becomes weak, and it becomes difficult to correct spherical aberration. In order to reliably obtain the effect, the upper limit value of Conditional Expression (4) can be preferably 0.90. In order to further reliably obtain the effect, the upper limit value of Conditional Expression (4) can be preferably 0.88.

On the other hand, when the correspondence value of Conditional Expression (4) is smaller than the lower limit value, the concave refractive power on the cemented surface of the lens component having a positive refractive power and the lens component having a negative refractive power becomes strong, and correction of spherical aberration becomes too much. In order to reliably obtain the effect, the lower limit value of Conditional Expression (4) can be preferably 0.75. In order to further reliably obtain the effect, the lower limit value of Conditional Expression (4) can be preferably 0.78.

In the embodiments, it can be preferable that the front group have a cemented lens, the cemented lens be constituted by a lens component having a positive refractive power and a lens component having a negative refractive power, and Conditional Expression (5) below be satisfied.

$$1.7 < \nu 1/\nu 2 < 3.2 \quad (5)$$

where $\nu 1$: the Abbe number of the lens component having a positive refractive power, and $\nu 2$: the Abbe number of the lens component having a negative refractive power.

Conditional Expression (5) is a conditional expression for defining a ratio of the Abbe number of the lens component having a positive refractive power to the Abbe number of the lens component having a negative refractive power, the lens components constituting the cemented lens included in the front group of the fourth lens group. When Conditional Expression (5) is satisfied, it is possible to satisfactorily correct chromatic aberration.

When the correspondence value of Conditional Expression (5) exceeds the upper limit value, the Abbe number of the lens component having a negative refractive power becomes small, and correction of spherical aberration becomes too much. In order to reliably obtain the effect, the upper limit value of Conditional Expression (5) can be preferably 3.0. In order to further reliably obtain the effect, the upper limit value of Conditional Expression (5) can be preferably 2.9.

On the other hand, when the correspondence value of Conditional Expression (5) is smaller than the lower limit value, the Abbe number of the lens component having a negative refractive power becomes large, and it becomes difficult to correct chromatic aberration. In order to reliably obtain the effect, the lower limit value of Conditional Expression (5) can be preferably 1.9. In order to further reliably obtain the effect, the lower limit value of Conditional Expression (5) can be preferably 2.0.

In the embodiments, it can be preferable that the variable magnification optical system include: in order from an object along an optical axis, a first lens group having a positive refractive power; a second lens group having a negative refractive power; a third lens group having a positive refractive power; and a fourth lens group having a positive refractive power, wherein when varying magnification, the distance between the first lens group and the second lens group is changed, the distance between the second lens group and the third lens group is changed, and the distance between the third lens group and the fourth lens group is changed, and wherein Conditional Expression (6) below is satisfied.

$$0.5 < L4a/L4 < 0.9 \quad (6)$$

where

L4a: the largest distance among air distances in the fourth lens group, and

L4: the distance from a surface closest to the object to a surface closest to the image of the fourth lens group.

Conditional Expression (6) is a conditional expression for defining a ratio of the largest distance among air distances in the fourth lens group to the total thickness of the fourth lens group. When Conditional Expression (6) is satisfied, it is possible to satisfactorily correct spherical aberration and coma aberration without increasing the size of the variable magnification optical system and without increasing the size of a lens barrel accompanied by the increase in size of the variable magnification optical system.

When the correspondence value of Conditional Expression (6) exceeds the upper limit value, the size of the variable magnification optical system is increased, and thereby, the size of the lens barrel is increased. Further, it becomes difficult to correct spherical aberration. In order to reliably obtain the effect, the upper limit value of Conditional Expression (6) can be preferably 0.86. In order to further reliably obtain the effect, the upper limit value of Conditional Expression (6) can be preferably 0.82.

On the other hand, when the correspondence value of Conditional Expression (6) is smaller than the lower limit value, it becomes difficult to correct various aberrations including coma aberration. In order to reliably obtain the effect, the lower limit value of Conditional Expression (6) can be preferably 0.55. In order to further reliably obtain the effect, the lower limit value of Conditional Expression (6) can be preferably 0.60.

In an embodiment, an optical apparatus includes the variable magnification optical system having the configuration described above. Thereby, it is possible to make the focusing group (focusing lens group) lightweight and realize an optical apparatus having a high quietness at the time of autofocus.

In an embodiment, a variable magnification optical system manufacturing method is a manufacturing method of a variable magnification optical system, including: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, the method including: arranging, when varying magnification, such that the first lens group moves with respect to an image plane, the distance between the first lens group and the negative lens group is changed, and the distance between the negative lens group and the positive lens group is changed; and arranging, when focusing, such that the distance between the focusing group and a lens arranged at a position to face an object-side of the focusing group is changed, and the distance between the focusing group and a lens arranged at a position to face an image-side of the focusing group is changed, wherein the focusing group is constituted by a single lens component, wherein the positive lens group is constituted by a front group having a positive refractive power and a rear group having a negative refractive power, wherein the distance between the front group and the rear group is the largest air distance among air distances in the positive lens group, and wherein the rear group is constituted by two lens components.

In an alternative embodiment, a variable magnification optical system manufacturing method is a manufacturing method of a variable magnification optical system, including: in order from an object along an optical axis, a first lens group having a positive refractive power; a second lens group having a negative refractive power; a third lens group having a positive refractive power; and a fourth lens group having a positive refractive power, the method including: configuring such that the third lens group is constituted by a single lens component; configuring such that the fourth lens group is constituted by a front group having a positive refractive power and a rear group having a negative refractive power; configuring such that the distance between the front group and the rear group is the largest air distance among air distances in the fourth lens group; configuring such that the rear group is constituted by two lens components; configuring such that when varying magnification, the distance between the first lens group and the second lens group is changed, the distance between the second lens group and the third lens group is changed, and the distance between the third lens group and the fourth lens group is changed; and configuring such that when focusing from an object at infinity to an object at a close distance, the third lens group moves.

According to the variable magnification optical system manufacturing methods, it is possible to make the focusing group lightweight and manufacture a variable magnification optical system having a high quietness at the time of autofocus.

NUMERICAL EXAMPLES

Hereinafter, a variable magnification optical system according to numerical examples is described with reference to the accompanied drawings.

Example 1

FIG. 1 is a cross-sectional view showing a lens configuration of a variable magnification optical system according to Example 1.

As shown in FIG. 1, a variable magnification optical system according to the present Example is constituted by, in order from an object along an optical axis, a first lens group G1 having a positive refractive power; a second lens group G2 having a negative refractive power; a third lens group G3 having a positive refractive power; and a fourth lens group G4 having a positive refractive power.

The first lens group G1 is constituted by, in order from the object along the optical axis, a positive lens L11 having a biconvex shape and a cemented positive lens that includes a negative meniscus lens L12 having a convex surface oriented toward the object and a positive meniscus lens L13 having a convex surface oriented toward the object.

The second lens group G2 is constituted by, in order from the object along the optical axis, a cemented negative lens that includes a negative lens L21 having a biconcave shape and a positive meniscus lens L22 having a convex surface oriented toward the object and a negative lens L23 having a concave surface oriented toward the object.

The third lens group G3 is constituted by a positive lens L31 having a biconvex shape.

The fourth lens group G4 is constituted by, in order from the object along the optical axis, a front group G4F having a positive refractive power, an aperture stop S, and a rear group G4R.

The front group G4F is constituted by, in order from the object along the optical axis, a cemented positive lens that includes a positive lens L41 having a biconvex shape and a negative lens L42 having a biconcave shape and a positive lens L43 having a biconvex shape.

The rear group G4R is constituted by, in order from the object along the optical axis, a cemented positive lens that includes a negative meniscus lens L44 having a convex surface oriented toward the object and a positive lens L45 having a biconvex shape and a negative meniscus lens L46 having a concave surface oriented toward the object.

An imaging element (not shown) constituted by a CCD, CMOS, or the like is arranged on an image plane I.

In the variable magnification optical system according to the present Example having the above configuration, when varying magnification from the wide-angle end state to the telephoto end state, the first lens group G1, the second lens group G2, the third lens group G3, and the fourth lens group G4 are moved along the optical axis with respect to the image plane I such that the distance between the first lens group G1 and the second lens group G2 is increased, the distance between the second lens group G2 and the third lens group G3 is decreased, and the distance between the third lens group G3 and the fourth lens group G4 is increased. In detail, the first lens group is moved toward the object, the second lens group is moved once toward the image and is then moved toward the object, the third lens group G3 is moved toward the object, and the fourth lens group G4 is moved toward the object. The aperture stop S is moved together with the fourth lens group G4 when varying magnification from the wide-angle end state to the telephoto end state.

In the variable magnification optical system according to the present Example, focusing from an object at infinity to an object at a close distance is performed by moving the third lens group G3 toward the image plane.

Table 1 below shows values of specifications of the variable magnification optical system according to the present Example.

In Table 1, "f" indicates the focal length, and "Bf" indicates the back focus (distance on the optical axis between a lens surface closest to the image and the image plane I).

In [Surface Data], a "surface number" indicates a sequence number of an optical surface counted from the object side, "r" indicates the radius of curvature, "d" indicates the surface distance (distance between an n-th surface (n is an integer) and an (n+1)-th surface), "nd" indicates the refractive index for the d-line (wavelength: 587.6 nm), and "vd" indicates the Abbe number for the d-line (wavelength: 587.6 nm). Moreover, an "object plane" indicates the object plane, "variable" indicates a variable distance between surfaces, an "aperture stop S" indicates the aperture stop S, and an "image plane" indicates the image plane I. The radius of curvature "r=∞" indicates a flat surface. The refractive index nd=1.000000 of air is not shown.

In [Various Data], "FNO" indicates the F-number, "2ω" indicates an angle of view (unit: "°"), "Ymax" indicates the maximum image height, "TL" indicates the entire length (distance on the optical axis from a first surface to the image plane I when focusing an object at infinity) of the variable magnification optical system, and "dn" (n is an integer) indicates a variable surface distance between the n-th surface and the (n+1)-th surface. "W" indicates the wide-angle end state, "M" indicates the intermediate focal length state, "T" indicates the telephoto end state, "Infinity" indicates when focusing an object at infinity, and "Close distance" indicates when focusing an object at a close distance.

In [Lens Group Data], the starting surface and the focal length of each lens group are shown.

In [Conditional Expression Correspondence Values], the correspondence values of each conditional expression of the variable magnification optical system according to the present Example are shown.

"mm" is generally used as the unit of the focal length f, the radius of curvature r, and other lengths shown in Table 1. However, the unit is not limited to this since an equivalent optical performance can be obtained even when the optical system is proportionally expanded or proportionally reduced.

The same symbols as in Table 1 described above are used in Tables of other examples to be described later.

TABLE 1

Example 1

[Surface Data]

| Surface number | r | d | nd | vd |
|---|---|---|---|---|
| Object plane | ∞ | | | |
| 1) | 76.4258 | 6.548 | 1.51680 | 63.88 |
| 2) | -464.2314 | 0.358 | | |
| 3) | 90.4822 | 1.500 | 1.62004 | 36.40 |
| 4) | 33.2495 | 8.383 | 1.51680 | 63.88 |
| 5) | 160.8334 | (Variable) | | |
| 6) | -316.0803 | 1.032 | 1.69680 | 55.52 |
| 7) | 18.6751 | 3.799 | 1.80518 | 25.45 |
| 8) | 40.0554 | 3.549 | | |
| 9) | -33.1981 | 1.000 | 1.69680 | 55.52 |
| 10) | -1117.3765 | (Variable) | | |
| 11) | 80.6415 | 4.186 | 1.51680 | 63.88 |
| 12) | -52.0308 | (Variable) | | |
| 13) | 59.4932 | 5.360 | 1.48749 | 70.31 |
| 14) | -32.1755 | 1.000 | 1.85026 | 32.35 |
| 15) | 2430.7009 | 0.200 | | |
| 16) | 36.9252 | 4.137 | 1.48749 | 70.31 |
| 17) | -180.2758 | 1.591 | | |
| 18) | (Aperture stop) ∞ | 33.593 | | |
| 19) | 103.7551 | 1.000 | 1.80610 | 40.97 |
| 20) | 20.5037 | 3.557 | 1.72825 | 28.38 |
| 21) | -170.9425 | 2.800 | | |
| 22) | -23.0279 | 1.000 | 1.77250 | 49.62 |
| 23) | -56.4025 | (BF) | | |
| Image plane | ∞ | | | |

[Various Data]
Variable Magnification Ratio: 4.12

| | W | M | T |
|---|---|---|---|
| f | 71.4 | 105.0 | 294.0 |
| FNO | 4.13 | 4.13 | 6.39 |
| 2ω | 22.78 | 15.24 | 5.48 |
| Ymax | 14.25 | 14.25 | 14.25 |
| TL | 166.24 | 183.88 | 219.32 |
| Bf | 38.52 | 38.52 | 73.98 |

| | W Infinity | M Infinity | T Infinity | W Close distance | M Close distance | T Close distance |
|---|---|---|---|---|---|---|
| d5 | 4.336 | 25.853 | 44.310 | 4.336 | 25.853 | 44.310 |
| d10 | 25.705 | 20.825 | 2.000 | 26.431 | 21.891 | 3.062 |
| d12 | 13.089 | 14.088 | 14.437 | 12.363 | 13.022 | 13.375 |

TABLE 1-continued

Example 1

[Lens Group Data]

| Group | Starting surface | f |
|---|---|---|
| G1 | 1 | 115.617 |
| G2 | 6 | −26.471 |
| G3 | 11 | 61.860 |
| G4 | 13 | 122.679 |

[Each of Conditional Expression Correspondence Values]

(1) fF/(−fR) = 0.832
(2) f1/(−f2) = 4.368
(3) f4/f3 = 1.983
(4) n1/n2 = 0.804
(5) ν1/ν2 = 2.173
(6) L4a/L4 = 0.649

Figure 2:
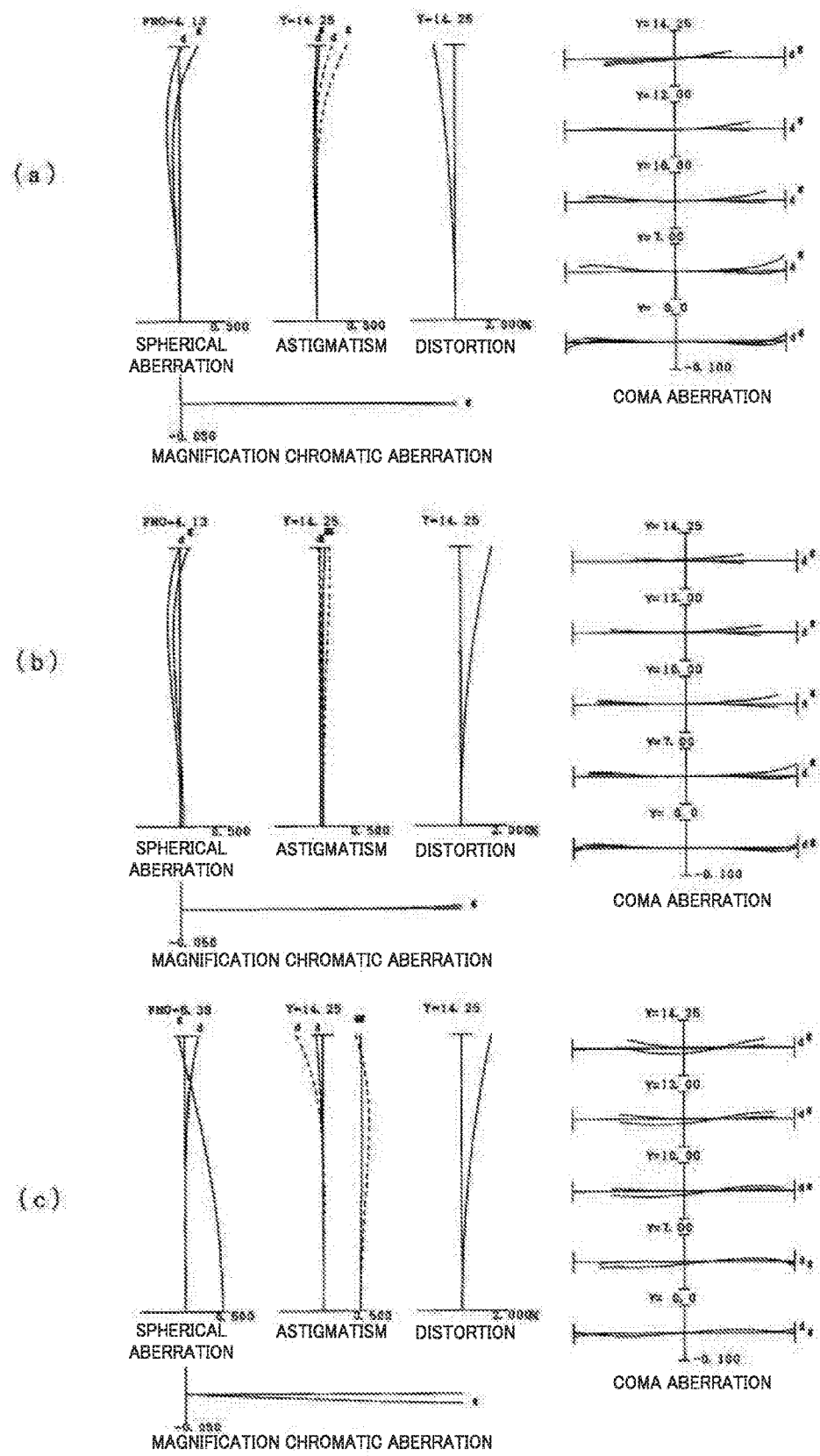
FIG. 2 shows graphs of various aberrations of the variable magnification optical system according to Example 1 when focusing an object at infinity, wherein part (a) shows a wide-angle end state, part (b) shows an intermediate focal length state, and part (c) shows a telephoto end state.

FIG. 2 shows graphs of various aberrations of the variable magnification optical system according to Example 1 when focusing an object at infinity, wherein part (a) shows a wide-angle end state, part (b) shows an intermediate focal length state, and part (c) shows a telephoto end state.

Figure 3:
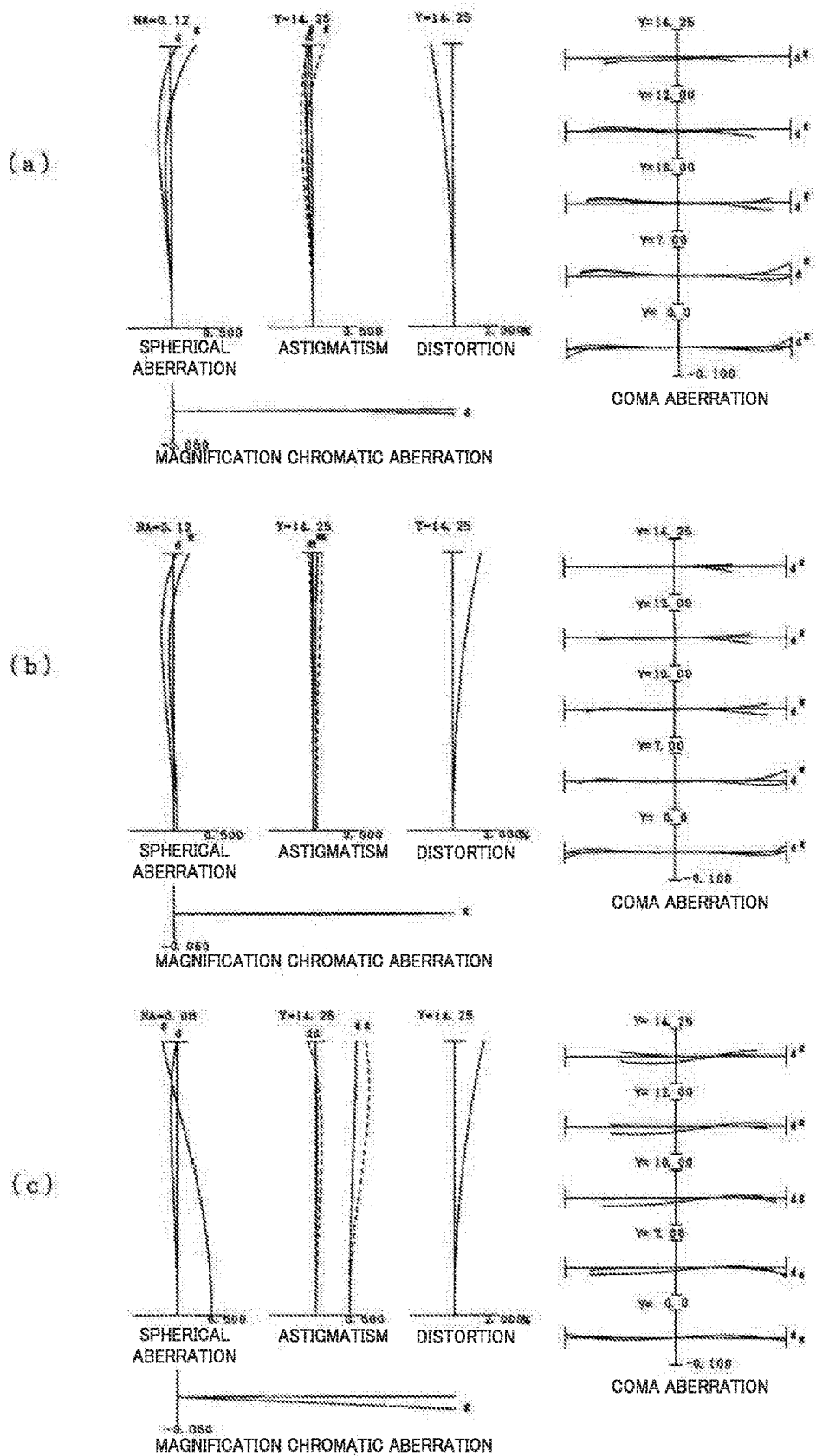
FIG. 3 shows graphs of various aberrations of the variable magnification optical system according to Example 1 when focusing an object at a close distance, wherein part (a) shows the wide-angle end state, part (b) shows the intermediate focal length state, and part (c) shows the telephoto end state.

FIG. 3 shows graphs of various aberrations of the variable magnification optical system according to Example 1 when focusing an object at a close distance, wherein part (a) shows the wide-angle end state, part (b) shows the intermediate focal length state, and part (c) shows the telephoto end state.

In the aberration graphs, "FNO" indicates the F-number, "NA" indicates a numerical aperture, and "Y" indicates the image height. In the graphs, "d" indicates an aberration curve for the d-line (wavelength λ=587.6 nm), "g" indicates an aberration curve for the g-line (wavelength λ=435.8 nm), and an aberration curve which is not indicated by a reference symbol indicates an aberration curve for the d-line. In the spherical aberration graphs, values of the F-number FNO or the numerical aperture corresponding to the maximum aperture are shown. In the astigmatism graphs and the distortion graphs, maximum values of the image height are shown. In the coma aberration graphs, values of each image height are shown. In the aberration graphs showing astigmatism, a solid line indicates a sagittal image plane, and a broken line indicates a meridional image plane. The same reference symbols as the present Example are used in the various aberration graphs of examples shown below.

It can be clearly understood from the aberration graphs that the variable magnification optical system according to Example 1 satisfactorily corrects various aberrations throughout from the wide-angle end state to the telephoto end state, has an excellent imaging performance, and further has an excellent imaging performance even when focusing an object at a close distance.

Example 2

Figure 4:
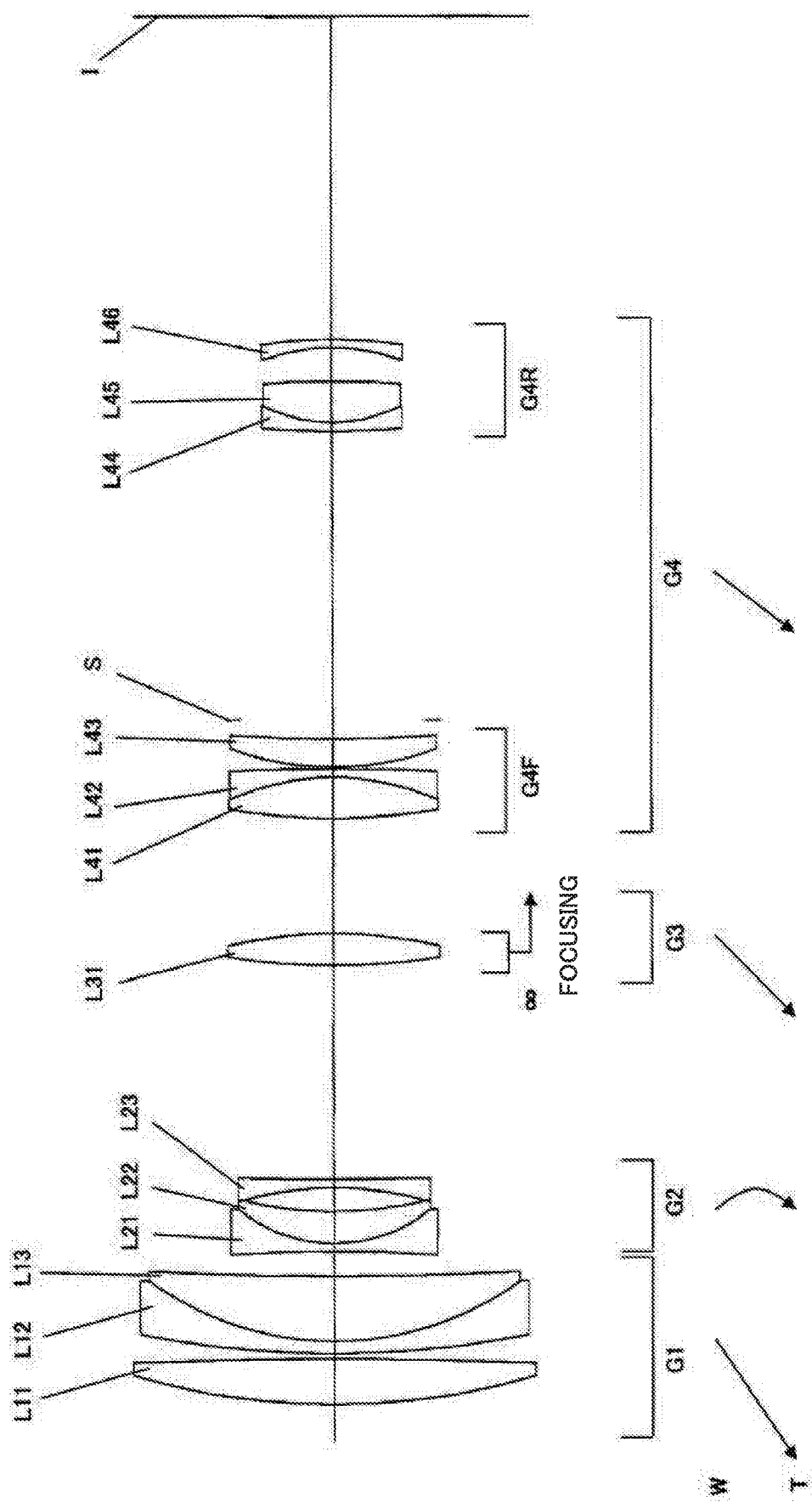
FIG. 4 is a cross-sectional view showing a configuration of a variable magnification optical system according to Example 2.

FIG. 4 is a cross-sectional view showing a lens configuration of a variable magnification optical system according to Example 2.

As shown in FIG. 4, a variable magnification optical system according to the present Example is constituted by, in order from an object along an optical axis, a first lens group G1 having a positive refractive power; a second lens group G2 having a negative refractive power; a third lens group G3 having a positive refractive power; and a fourth lens group G4 having a positive refractive power.

The first lens group G1 is constituted by, in order from the object along the optical axis, a positive lens L11 having a biconvex shape and a cemented positive lens that includes a negative meniscus lens L12 having a convex surface oriented toward the object and a positive meniscus lens L13 having a convex surface oriented toward the object.

The second lens group G2 is constituted by, in order from the object along the optical axis, a cemented negative lens that includes a negative lens L21 having a biconcave shape and a positive meniscus lens L22 having a convex surface oriented toward the object and a negative lens L23 having a biconcave shape.

The third lens group G3 is constituted by a positive lens L31 having a biconvex shape.

The fourth lens group G4 is constituted by, in order from the object along the optical axis, a front group G4F having a positive refractive power, an aperture stop S, and a rear group G4R.

The front group G4F is constituted by, in order from the object along the optical axis, a cemented positive lens that includes a positive lens L41 having a biconvex shape and a negative meniscus lens L42 having a concave surface oriented toward the object and a positive meniscus lens L43 having a convex surface oriented toward the object.

The rear group G4R is constituted by, in order from the object along the optical axis, a cemented positive lens that includes a negative meniscus lens L44 having a convex surface oriented toward the object and a positive lens L45 having a biconvex shape and a negative meniscus lens L46 having a concave surface oriented toward the object.

An imaging element (not shown) constituted by a CCD, CMOS, or the like is arranged on an image plane I.

In the variable magnification optical system according to the present Example having the above configuration, when varying magnification from the wide-angle end state to the telephoto end state, the first lens group G1, the second lens group G2, the third lens group G3, and the fourth lens group G4 are moved along the optical axis with respect to the image plane I such that the distance between the first lens group G1 and the second lens group G2 is increased, the distance between the second lens group G2 and the third lens group G3 is decreased, and the distance between the third lens group G3 and the fourth lens group G4 is increased. In detail, the first lens group is moved toward the object, the second lens group is moved once toward the image and is then moved toward the object, the third lens group G3 is moved toward the object, and the fourth lens group G4 is moved toward the object. The aperture stop S is moved together with the fourth lens group G4 when varying magnification from the wide-angle end state to the telephoto end state.

In the variable magnification optical system according to the present Example, focusing from an object at infinity to an object at a close distance is performed by moving the third lens group G3 toward the image plane.

Table 2 below shows values of specifications of the variable magnification optical system according to the present Example.

TABLE 2

Example 2

[Surface Data]

| Surface number | r | d | nd | vd |
|---|---|---|---|---|
| Object plane | ∞ | | | |
| 1) | 86.5140 | 5.500 | 1.51680 | 63.88 |
| 2) | −590.6740 | 0.642 | | |
| 3) | 118.2660 | 1.500 | 1.62004 | 36.40 |
| 4) | 37.8433 | 8.000 | 1.51680 | 63.88 |
| 5) | 464.3230 | (Variable) | | |
| 6) | −180.0300 | 1.000 | 1.69680 | 55.52 |
| 7) | 18.7396 | 3.789 | 1.80518 | 25.45 |
| 8) | 47.3058 | 2.843 | | |
| 9) | −40.0856 | 1.000 | 1.77250 | 49.62 |
| 10) | 426.1263 | (Variable) | | |
| 11) | 80.5313 | 3.897 | 1.51680 | 63.88 |
| 12) | −54.0834 | (Variable) | | |
| 13) | 77.9117 | 4.895 | 1.48749 | 70.31 |
| 14) | −30.8533 | 1.000 | 1.72825 | 28.38 |
| 15) | −280.6767 | 0.200 | | |
| 16) | 35.5006 | 3.290 | 1.48749 | 70.31 |
| 17) | 199.3937 | 2.336 | | |
| 18) | (Aperture stop) ∞ | 34.528 | | |
| 19) | 115.8527 | 1.000 | 1.77250 | 49.62 |
| 20) | 18.2444 | 5.000 | 1.67270 | 32.19 |
| 21) | −110.1987 | 4.000 | | |
| 22) | −24.6132 | 1.000 | 1.80610 | 40.97 |
| 23) | −57.1535 | (BF) | | |
| Image plane | ∞ | | | |

[Various Data]
Variable Magnification Ratio: 4.12

| | W | M | T |
|---|---|---|---|
| f | 71.4 | 105.0 | 294.0 |
| FNO | 4.53 | 4.54 | 6.34 |
| 2ω | 22.68 | 15.20 | 5.44 |
| Ymax | 14.25 | 14.25 | 14.25 |
| TL | 166.32 | 187.07 | 219.32 |
| Bf | 38.51 | 38.71 | 64.52 |

| | W Infinity | M Infinity | T Infinity | W Close distance | M Close distance | T Close distance |
|---|---|---|---|---|---|---|
| d5 | 3.000 | 27.049 | 51.658 | 3.000 | 27.049 | 51.658 |
| d10 | 25.565 | 21.031 | 2.000 | 26.211 | 21.973 | 3.224 |
| d12 | 13.818 | 14.860 | 15.725 | 13.172 | 13.917 | 14.501 |

[Lens Group Data]

| Group | Starting surface | f |
|---|---|---|
| G1 | 1 | 120.601 |
| G2 | 6 | −26.990 |
| G3 | 11 | 63.229 |
| G4 | 13 | 117.957 |

[Each of Conditional Expression Correspondence Values]

| (1) fF/(−fR) = | 0.854 |
|---|---|
| (2) f1/(−f2) = | 4.468 |
| (3) f4/f3 = | 1.866 |
| (4) n1/n2 = | 0.861 |
| (5) v1/v2 = | 2.477 |
| (6) L4a/L4 = | 0.644 |

Figure 5:
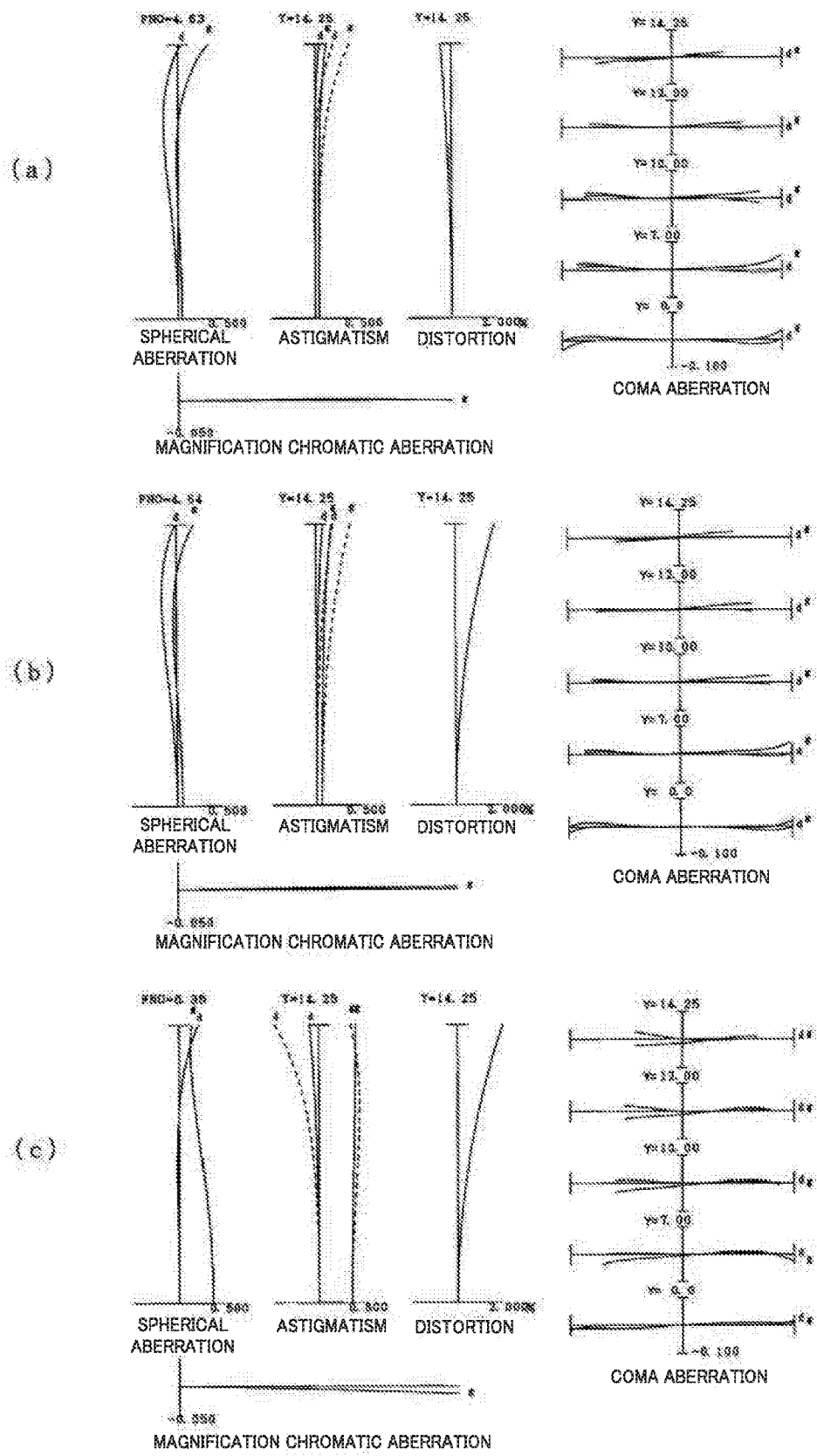
FIG. 5 shows graphs of various aberrations of the variable magnification optical system according to Example 2 when focusing an object at infinity, wherein part (a) shows the wide-angle end state, part (b) shows the intermediate focal length state, and part (c) shows the telephoto end state.

FIG. 5 shows graphs of various aberrations of the variable magnification optical system according to Example 2 when focusing an object at infinity, wherein part (a) shows a wide-angle end state, part (b) shows an intermediate focal length state, and part (c) shows a telephoto end state.

Figure 6:
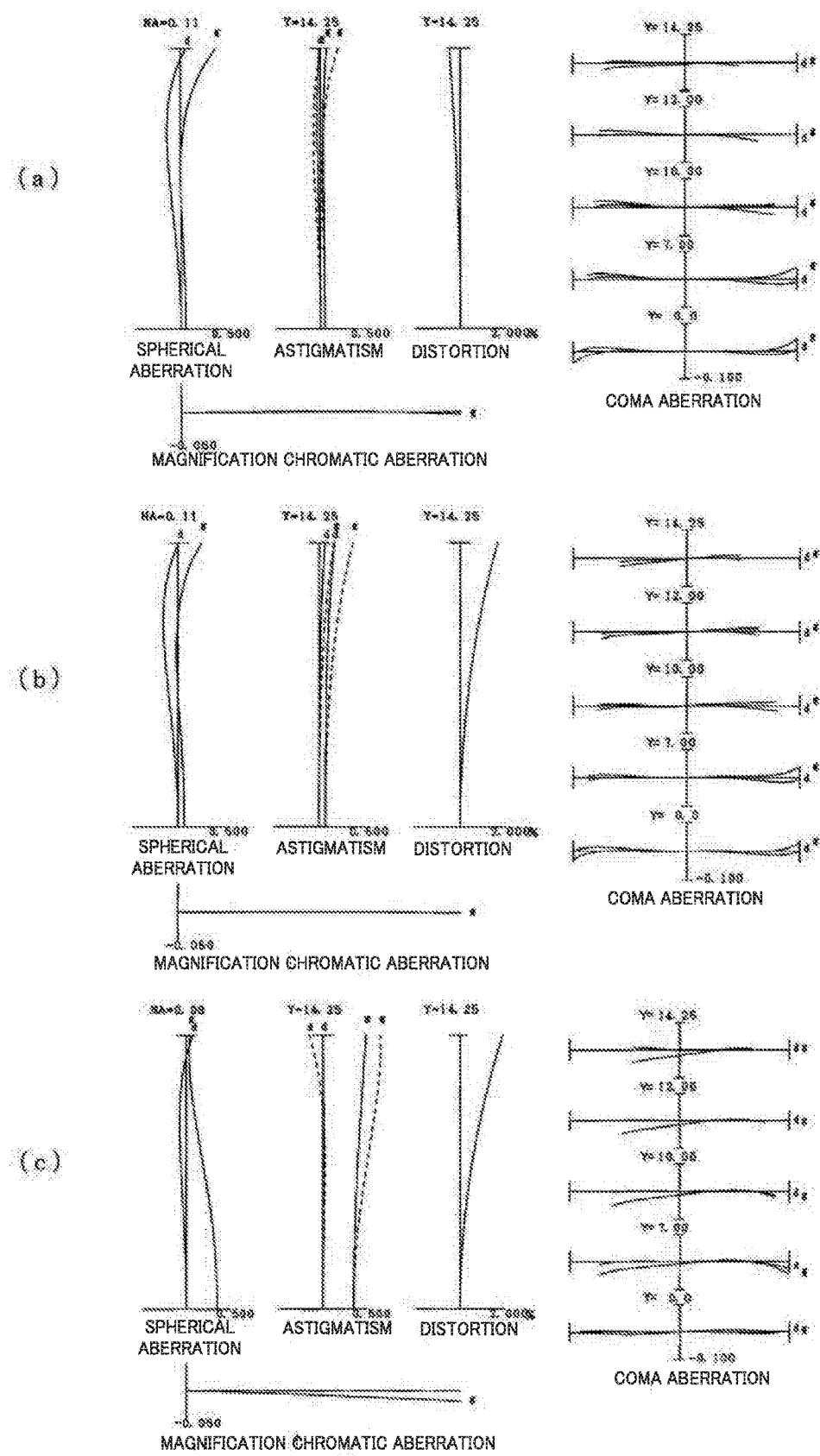
FIG. 6 shows graphs of various aberrations of the variable magnification optical system according to Example 2 when focusing an object at a close distance, wherein part (a) shows the wide-angle end state, part (b) shows the intermediate focal length state, and part (c) shows the telephoto end state.

FIG. 6 shows graphs of various aberrations of the variable magnification optical system according to Example 2 when focusing an object at a close distance, wherein part (a) shows the wide-angle end state, part (b) shows the intermediate focal length state, and part (c) shows the telephoto end state.

It can be clearly understood from the aberration graphs that the variable magnification optical system according to Example 2 satisfactorily corrects various aberrations throughout from the wide-angle end state to the telephoto end state, has an excellent imaging performance, and further has an excellent imaging performance even when focusing an object at a close distance.

Example 3

Figure 7:
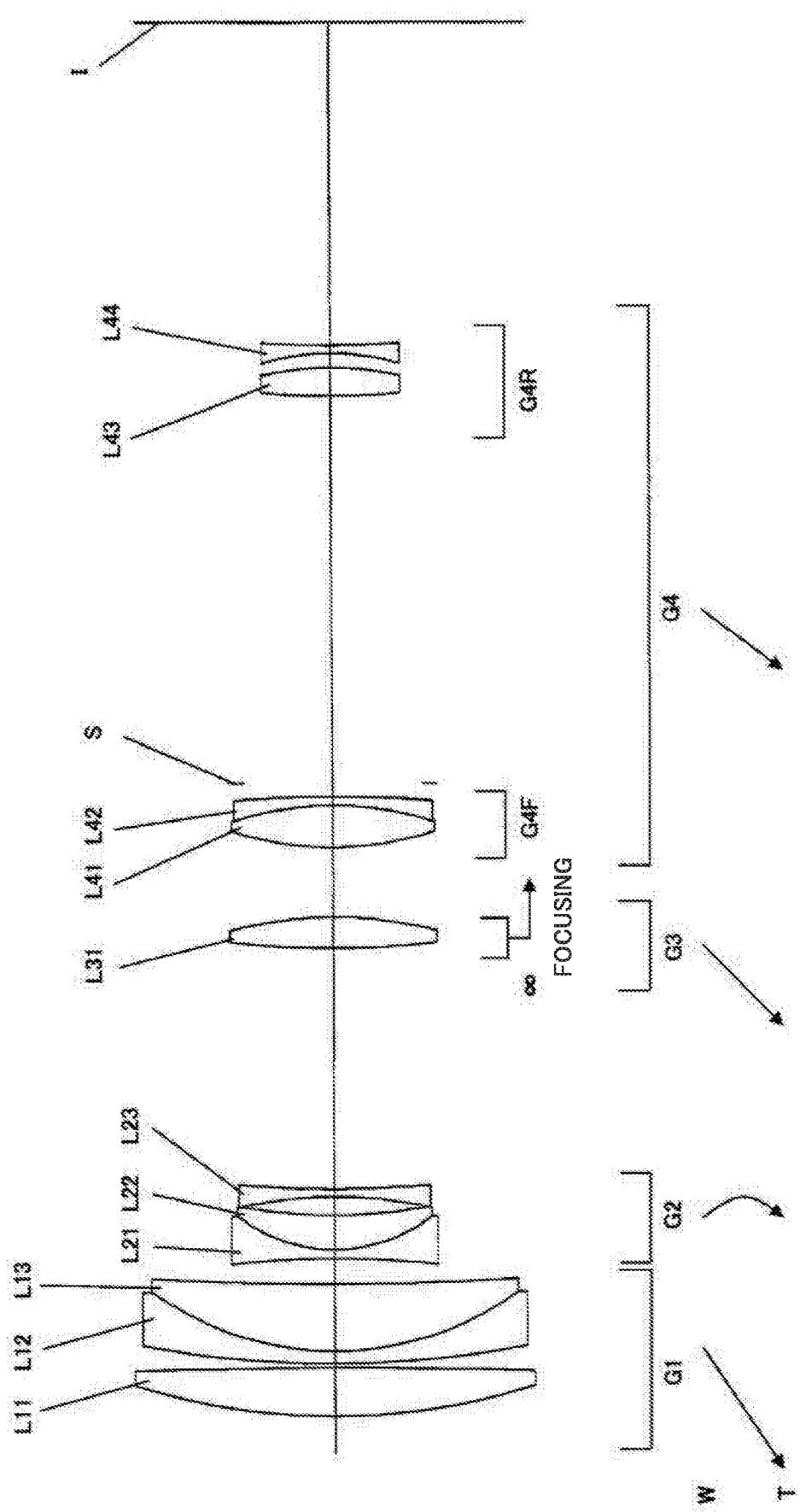
FIG. 7 is a cross-sectional view showing a configuration of a variable magnification optical system according to Example 3.

FIG. 7 is a cross-sectional view showing a lens configuration of a variable magnification optical system according to Example 3.

As shown in FIG. 7, a variable magnification optical system according to the present Example is constituted by, in order from an object along an optical axis, a first lens group G1 having a positive refractive power; a second lens group G2 having a negative refractive power; a third lens group G3 having a positive refractive power; and a fourth lens group G4 having a positive refractive power.

The first lens group G1 is constituted by, in order from the object along the optical axis, a positive lens L11 having a biconvex shape and a cemented positive lens that includes a negative meniscus lens L12 having a convex surface oriented toward the object and a positive meniscus lens L13 having a convex surface oriented toward the object.

The second lens group G2 is constituted by, in order from the object along the optical axis, a cemented negative lens that includes a negative lens L21 having a biconcave shape and a positive meniscus lens L22 having a convex surface oriented toward the object and a negative lens L23 having a biconcave shape.

The third lens group G3 is constituted by a positive lens L31 having a biconvex shape.

The fourth lens group G4 is constituted by, in order from the object along the optical axis, a front group G4F having a positive refractive power, an aperture stop S, and a rear group G4R.

The front group G4F is constituted by, in order from the object along the optical axis, a cemented positive lens that includes a positive lens L41 having a biconvex shape and a negative meniscus lens L42 having a concave surface oriented toward the object.

The rear group G4R is constituted by, in order from the object along the optical axis, a positive lens L43 having a biconvex shape and a negative lens L44 having a biconcave shape.

An imaging element (not shown) constituted by a CCD, CMOS, or the like is arranged on an image plane I.

In the variable magnification optical system according to the present Example having the above configuration, when varying magnification from the wide-angle end state to the telephoto end state, the first lens group G1, the second lens group G2, the third lens group G3, and the fourth lens group G4 are moved along the optical axis with respect to the image plane I such that the distance between the first lens group G1 and the second lens group G2 is increased, the distance between the second lens group G2 and the third lens group G3 is decreased, and the distance between the third lens group G3 and the fourth lens group G4 is increased. In detail, the first lens group is moved toward the object, the second lens group is moved once toward the image and is then moved toward the object, the third lens group G3 is moved toward the object, and the fourth lens group G4 is moved toward the object. The aperture stop S is moved together with the fourth lens group G4 when varying magnification from the wide-angle end state to the telephoto end state.

In the variable magnification optical system according to the present Example, focusing from an object at infinity to an object at a close distance is performed by moving the third lens group G3 toward the image plane.

Table 3 below shows values of specifications of the variable magnification optical system according to the present Example.

TABLE 3

Example 3

[Surface Data]

| Surface number | r | d | nd | vd |
|---|---|---|---|---|
| Object plane | ∞ | | | |
| 1) | 79.181 | 5.916 | 1.51680 | 63.88 |
| 2) | −865.935 | 0.515 | | |
| 3) | 123.870 | 1.500 | 1.62004 | 36.40 |
| 4) | 37.628 | 8.227 | 1.51680 | 63.88 |
| 5) | 402.325 | (Variable) | | |
| 6) | −104.719 | 1.000 | 1.69680 | 55.52 |
| 7) | 19.124 | 4.140 | 1.80518 | 25.45 |
| 8) | 65.634 | 2.236 | | |
| 9) | −50.951 | 1.000 | 1.80610 | 40.97 |
| 10) | 160.536 | (Variable) | | |
| 11) | 102.843 | 3.727 | 1.51680 | 63.88 |
| 12) | −48.859 | (Variable) | | |
| 13) | 38.795 | 5.043 | 1.48749 | 70.31 |
| 14) | −39.042 | 1.000 | 1.80518 | 25.45 |
| 15) | −165.709 | 1.620 | | |
| 16) | (Aperture stop) ∞ | 46.334 | | |
| 17) | 103.400 | 3.400 | 1.67270 | 32.19 |
| 18) | −36.557 | 1.727 | | |
| 19) | −27.830 | 1.000 | 1.77250 | 49.62 |
| 20) | 154.941 | (BF) | | |
| Image plane | ∞ | | | |

[Various Data]
Variable Magnification Ratio: 4.12

| | W | M | T |
|---|---|---|---|
| f | 71.4 | 105.0 | 294.0 |
| FNO | 4.71 | 4.72 | 6.40 |
| 2ω | 22.78 | 15.28 | 5.44 |
| Ymax | 14.25 | 14.25 | 14.25 |
| TL | 167.33 | 188.29 | 221.32 |
| BF | 38.51 | 38.72 | 64.52 |

| | W Infinity | M Infinity | T Infinity | W Close distance | M Close distance | T Close distance |
|---|---|---|---|---|---|---|
| d5 | 3.117 | 26.926 | 51.633 | 3.117 | 26.626 | 51.633 |
| d10 | 28.867 | 23.778 | 2.000 | 29.628 | 24.882 | 3.428 |
| d12 | 8.442 | 10.483 | 14.781 | 7.681 | 9.378 | 13.353 |

[Lens Group Data]

| Group | Starting surface | f |
|---|---|---|
| G1 | 1 | 122.444 |
| G2 | 6 | −28.587 |
| G3 | 11 | 64.633 |
| G4 | 13 | 141.232 |

[Each of Conditional Expression Correspondence Values]

(1) fF/(−fR) = 0.665
(2) f1/(−f2) = 4.283
(3) f4/f3 = 2.185
(4) n1/n2 = 0.824

TABLE 3-continued

Example 3

(5) ν1/ν2 = 2.763
(6) L4a/L4 = 0.798

Figure 8:
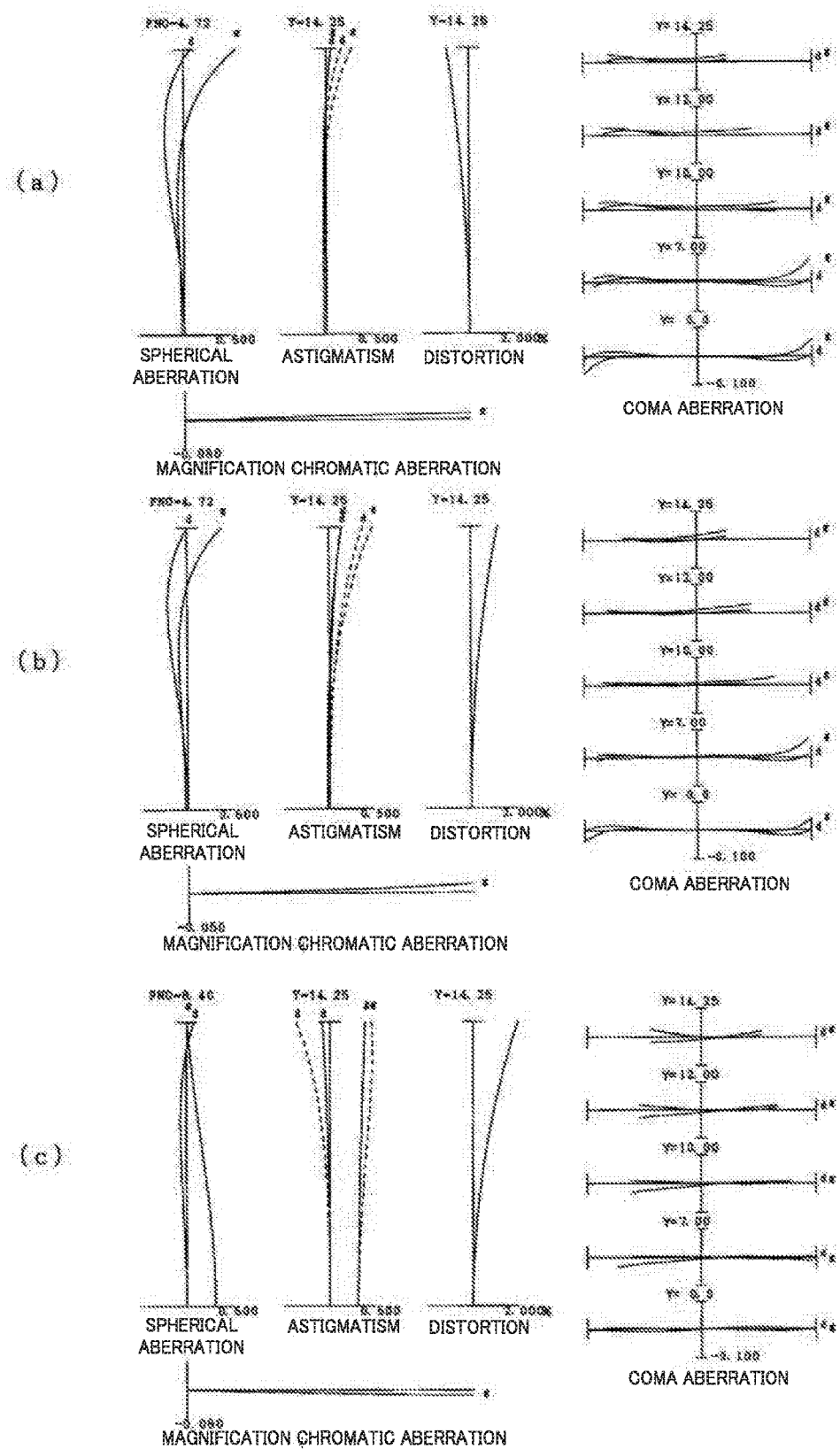
FIG. 8 shows graphs of various aberrations of the variable magnification optical system according to Example 3 when focusing an object at infinity, wherein part (a) shows the wide-angle end state, part (b) shows the intermediate focal length state, and part (c) shows the telephoto end state.

FIG. 8 shows graphs of various aberrations of the variable magnification optical system according to Example 3 when focusing an object at infinity, wherein part (a) shows a wide-angle end state, part (b) shows an intermediate focal length state, and part (c) shows a telephoto end state.

Figure 9:
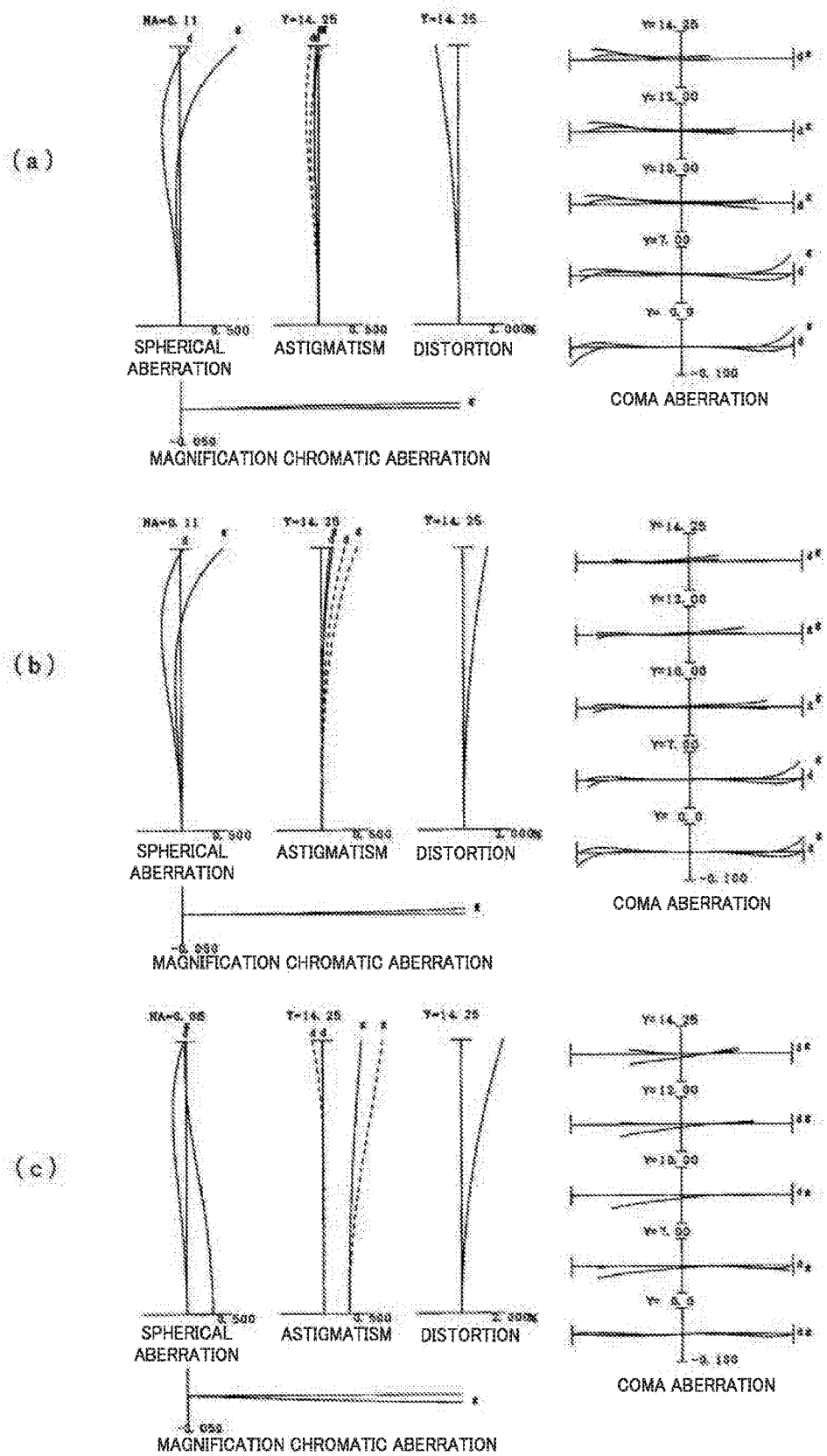
FIG. 9 shows graphs of various aberrations of the variable magnification optical system according to Example 3 when focusing an object at a close distance, wherein part (a) shows the wide-angle end state, part (b) shows the intermediate focal length state, and part (c) shows the telephoto end state.

FIG. 9 shows graphs of various aberrations of the variable magnification optical system according to Example 3 when focusing an object at a close distance, wherein part (a) shows the wide-angle end state, part (b) shows the intermediate focal length state, and part (c) shows the telephoto end state.

It can be clearly understood from the aberration graphs that the variable magnification optical system according to Example 3 satisfactorily corrects various aberrations throughout from the wide-angle end state to the telephoto end state, has an excellent imaging performance, and further has an excellent imaging performance even when focusing an object at a close distance.

Example 4

Figure 10:
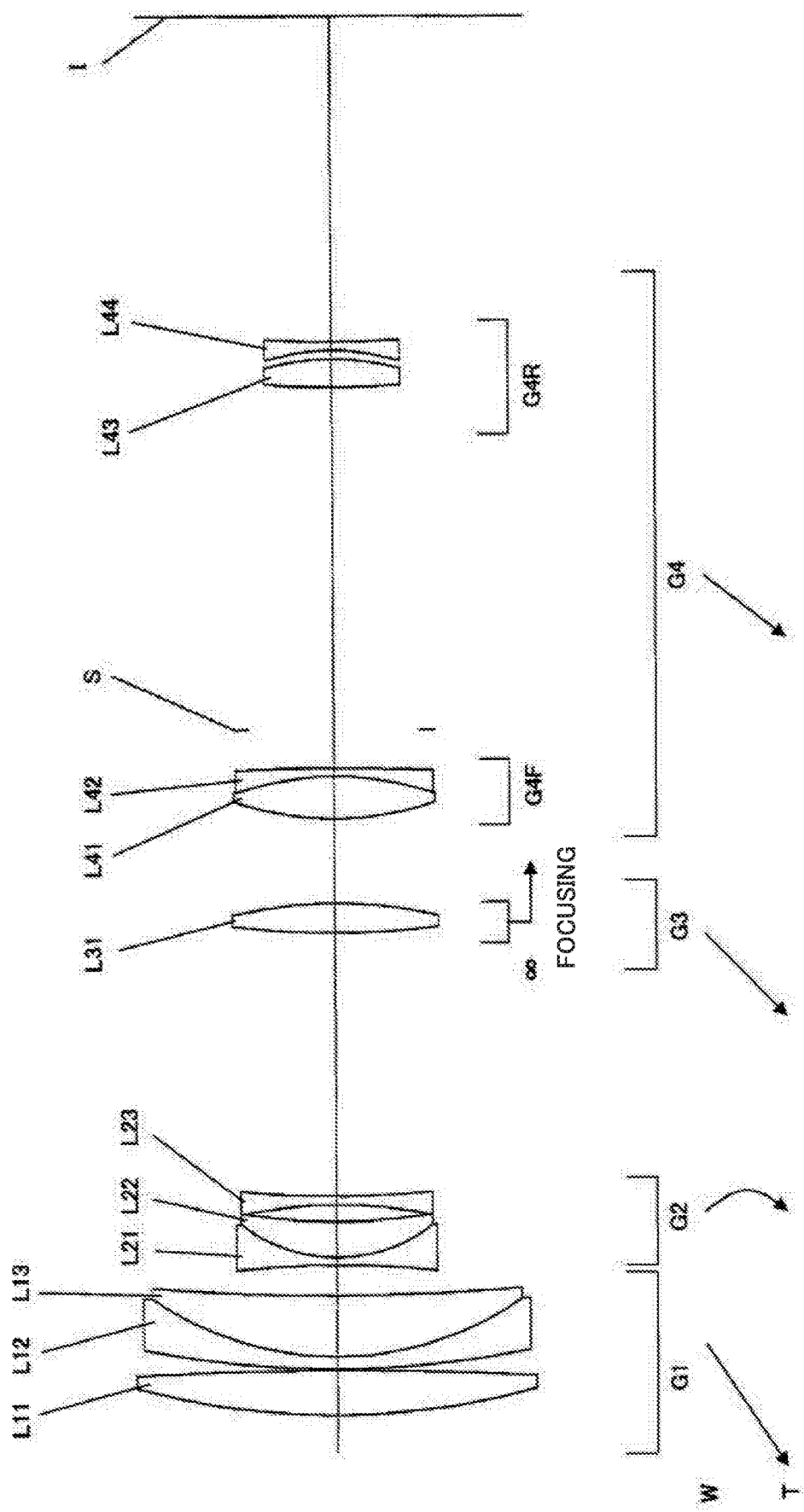
FIG. 10 is a cross-sectional view showing a configuration of a variable magnification optical system according to Example 4.

FIG. 10 is a cross-sectional view showing a lens configuration of a variable magnification optical system according to Example 4.

As shown in FIG. 10, a variable magnification optical system according to the present Example is constituted by, in order from an object along an optical axis, a first lens group G1 having a positive refractive power; a second lens group G2 having a negative refractive power; a third lens group G3 having a positive refractive power; and a fourth lens group G4 having a positive refractive power.

The first lens group G1 is constituted by, in order from the object along the optical axis, a positive lens L11 having a biconvex shape and a cemented positive lens that includes a negative meniscus lens L12 having a convex surface oriented toward the object and a positive meniscus lens L13 having a convex surface oriented toward the object.

The second lens group G2 is constituted by, in order from the object along the optical axis, a cemented negative lens that includes a negative lens L21 having a biconcave shape and a positive meniscus lens L22 having a convex surface oriented toward the object and a negative lens L23 having a biconcave shape.

The third lens group G3 is constituted by a positive lens L31 having a biconvex shape.

The fourth lens group G4 is constituted by, in order from the object along the optical axis, a front group G4F having a positive refractive power, an aperture stop S, and a rear group G4R.

The front group G4F is constituted by, in order from the object along the optical axis, a cemented positive lens that includes a positive lens L41 having a biconvex shape and a negative meniscus lens L42 having a concave surface oriented toward the object.

The rear group G4R is constituted by, in order from the object along the optical axis, a positive lens L43 having a biconvex shape and a negative lens L44 having a biconcave shape.

An imaging element (not shown) constituted by a CCD, CMOS, or the like is arranged on an image plane I.

In the variable magnification optical system according to the present Example having the above configuration, when varying magnification from the wide-angle end state to the telephoto end state, the first lens group G1, the second lens group G2, the third lens group G3, and the fourth lens group G4 are moved along the optical axis with respect to the image plane I such that the distance between the first lens group G1 and the second lens group G2 is increased, the distance between the second lens group G2 and the third lens group G3 is decreased, and the distance between the third lens group G3 and the fourth lens group G4 is increased. In detail, the first lens group is moved toward the object, the second lens group is moved once toward the image and is then moved toward the object, the third lens group G3 is moved toward the object, and the fourth lens group G4 is moved toward the object. The aperture stop S is moved together with the fourth lens group G4 when varying magnification from the wide-angle end state to the telephoto end state.

In the variable magnification optical system according to the present Example, focusing from an object at infinity to an object at a close distance is performed by moving the third lens group G3 toward the image plane.

Table 4 below shows values of specifications of the variable magnification optical system according to the present Example.

TABLE 4

Example 4

[Surface Data]

| Surface number | r | d | nd | vd |
|---|---|---|---|---|
| Object plane | ∞ | | | |
| 1) | 88.000 | 5.386 | 1.51680 | 63.88 |
| 2) | −470.597 | 0.200 | | |
| 3) | 116.000 | 1.500 | 1.62004 | 36.40 |
| 4) | 38.400 | 7.368 | 1.51680 | 63.88 |
| 5) | 262.431 | (Variable) | | |
| 6) | −115.000 | 1.000 | 1.69680 | 55.52 |
| 7) | 18.736 | 4.257 | 1.80518 | 25.45 |
| 8) | 75.513 | 2.005 | | |
| 9) | −53.736 | 1.000 | 1.80100 | 34.92 |
| 10) | 122.000 | (Variable) | | |
| 11) | 92.248 | 3.551 | 1.51680 | 63.88 |
| 12) | −55.188 | (Variable) | | |
| 13) | 37.517 | 5.015 | 1.49700 | 81.73 |
| 14) | −37.517 | 1.000 | 1.72825 | 28.38 |
| 15) | −271.936 | 4.500 | | |
| 16) | (Aperture stop) ∞ | 40.717 | | |
| 17) | 110.794 | 3.336 | 1.68893 | 31.16 |
| 18) | −32.526 | 1.096 | | |
| 19) | −25.909 | 1.000 | 1.77250 | 49.62 |
| 20) | 130.000 | (BF) | | |
| Image plane | ∞ | | | |

[Various Data]
Variable Magnification Ratio: 4.24

| | W | M | T |
|---|---|---|---|
| f | 69.3 | 104.5 | 294.0 |
| FNO | 4.69 | 4.75 | 6.46 |
| 2ω | 23.44 | 15.28 | 5.44 |
| Ymax | 14.25 | 14.25 | 14.25 |
| TL | 166.54 | 189.91 | 221.32 |
| BF | 38.53 | 39.04 | 64.52 |

| | W Infinity | M Infinity | T Infinity | W Close distance | M Close distance | T Close distance |
|---|---|---|---|---|---|---|
| d5 | 3.600 | 29.972 | 55.757 | 3.600 | 29.972 | 55.757 |
| d10 | 31.403 | 25.592 | 2.000 | 32.262 | 26.852 | 3.608 |
| d12 | 10.077 | 12.375 | 16.114 | 9.218 | 11.115 | 14.506 |

TABLE 4-continued

Example 4

[Lens Group Data]

| Group | Starting surface | f |
|---|---|---|
| G1 | 1 | 128.797 |
| G2 | 6 | −30.221 |
| G3 | 11 | 67.368 |
| G4 | 13 | 143.638 |

[Each of Conditional Expression Correspondence Values]

(1) fF/(−fR) = 0.719
(2) f1/(−f2) = 4.262
(3) f4/f3 = 2.117
(4) n1/n2 = 0.866
(5) ν1/ν2 = 2.880
(6) L4a/L4 = 0.798

Figure 11:
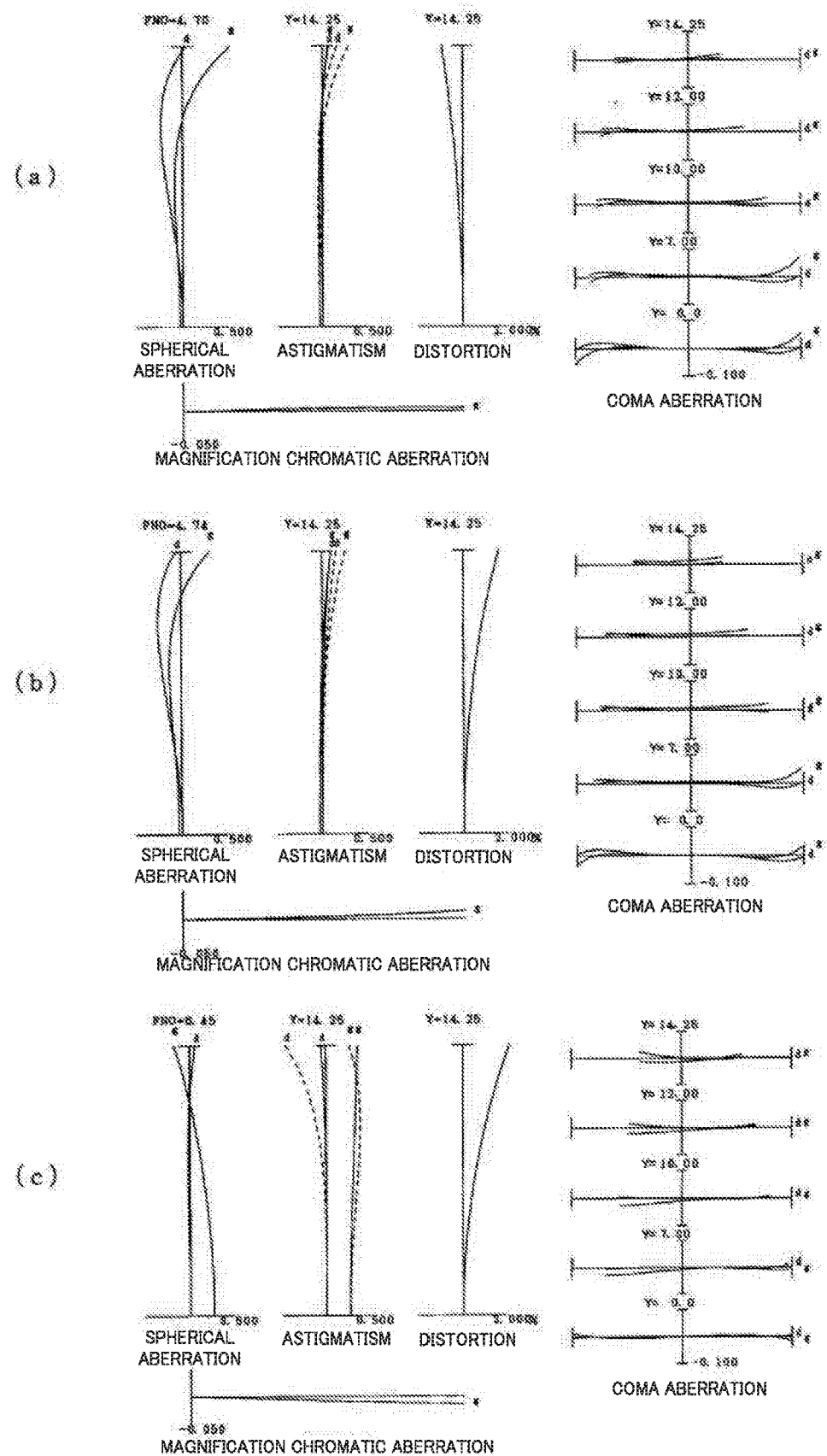
FIG. 11 shows graphs of various aberrations of the variable magnification optical system according to Example 4 when focusing an object at infinity, wherein part (a) shows the wide-angle end state, part (b) shows the intermediate focal length state, and part (c) shows the telephoto end state.

FIG. 11 shows graphs of various aberrations of the variable magnification optical system according to Example 4 when focusing an object at infinity, wherein part (a) shows a wide-angle end state, part (b) shows an intermediate focal length state, and part (c) shows a telephoto end state.

Figure 12:
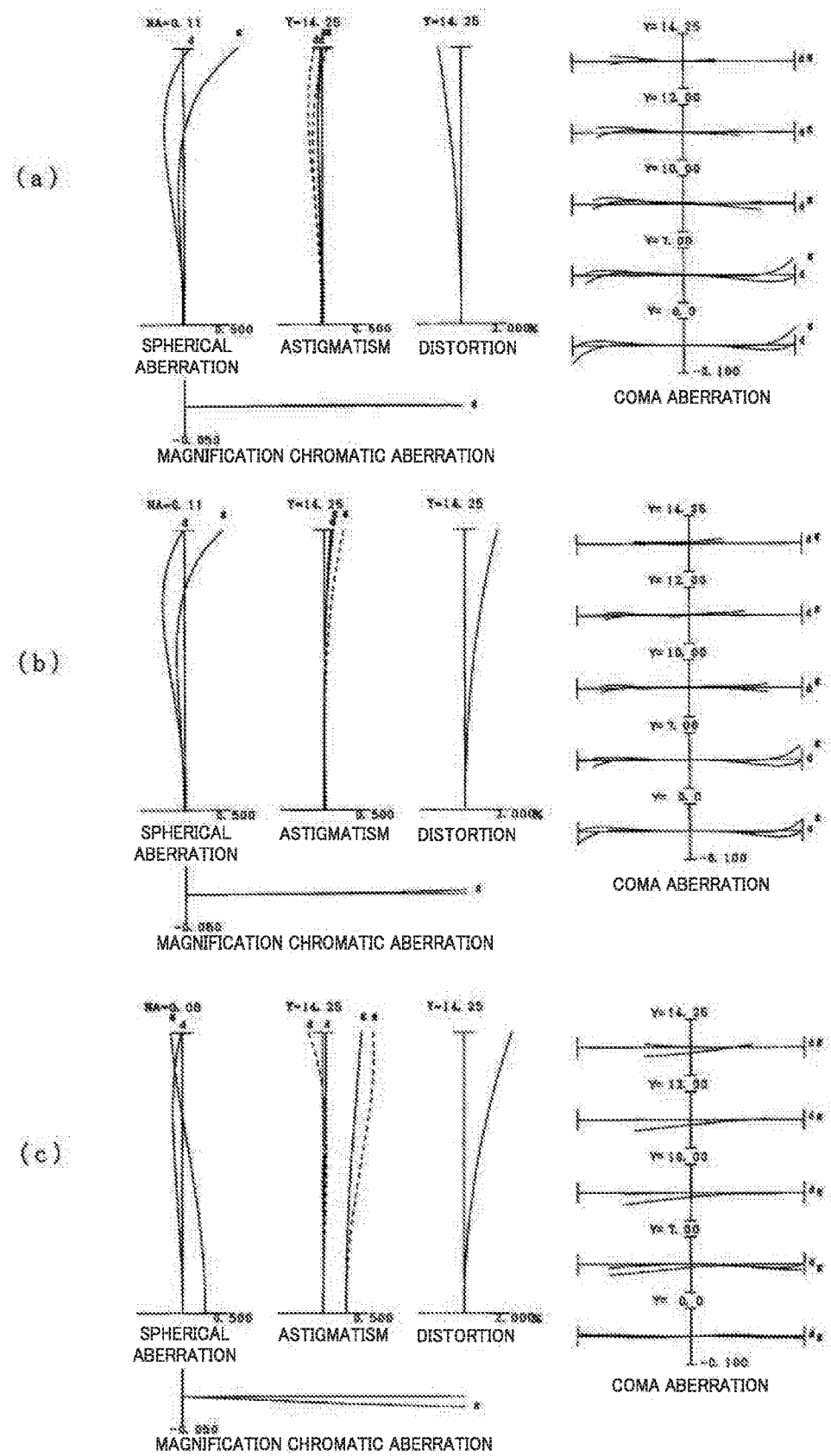
FIG. 12 shows graphs of various aberrations of the variable magnification optical system according to Example 4 when focusing an object at a close distance, wherein part (a) shows the wide-angle end state, part (b) shows the intermediate focal length state, and part (c) shows the telephoto end state.

FIG. 12 shows graphs of various aberrations of the variable magnification optical system according to Example 4 when focusing an object at a close distance, wherein part (a) shows the wide-angle end state, part (b) shows the intermediate focal length state, and part (c) shows the telephoto end state.

It can be clearly understood from the aberration graphs that the variable magnification optical system according to Example 4 satisfactorily corrects various aberrations throughout from the wide-angle end state to the telephoto end state, has an excellent imaging performance, and further has an excellent imaging performance even when focusing an object at a close distance.

As described above, according to Examples described above, it is possible to make the focusing group (focusing lens group) sufficiently lightweight. As a result, it is possible to realize a variable magnification optical system having a high quietness at the time of autofocus. Further, since the focusing group can be made lightweight, a large motor or actuator for moving the focusing group at a high speed becomes unnecessary, and it is possible to realize speed-up of autofocus without increasing the size of the lens barrel. Furthermore, it is possible to realize a variable magnification optical system having a high optical performance in which aberration variation when varying magnification from a wide-angle end state to a telephoto end state and aberration variation when focusing from an object at infinity to an object at a close distance are satisfactorily prevented.

Examples described above show specific examples, but the present embodiment is not limited thereto. The following content can be appropriately employed within a range where the optical performance of the variable magnification optical system is not diminished.

Although the numerical examples of a four-group configuration have been shown as numerical examples of the variable magnification optical system, the present embodiment is not limited thereto, and a configuration of a variable magnification optical system having another group configuration (for example, a five-group configuration, a six-group configuration, and the like) can be employed. Specifically, a configuration in which a lens or a lens group is added at a position closest to an object or at a position closest to an image of the variable magnification optical system may be employed. A lens group refers to a portion having at least one lens isolated by an air space which changes when varying magnification.

In Examples described above, an example is described in which the third lens group G3, which is the focusing group (focusing lens group), is constituted by a single lens; however, the third lens group G3 may be constituted by a cemented lens.

In the variable magnification optical system described above, the focusing group (focusing lens group) is also suitable for driving based on an autofocus motor such as an ultrasonic motor.

The lens surface of a lens that constitutes the variable magnification optical system may be a spherical surface or a flat surface or may be an aspherical surface. When the lens surface is a spherical surface or a flat surface, it is possible to facilitate lens processing, assembly, and adjustment and to prevent degradation of optical performance due to errors in the lens processing, assembly and adjustment. Moreover, degradation of rendering performance is slight even when the image plane is shifted. When the lens surface is an aspherical surface, the aspherical surface may be any of an aspherical surface obtained by grinding, a glass-molded aspherical surface obtained by molding glass into an aspherical shape, and a composite aspherical surface obtained by forming a resin provided on a glass surface into an aspherical shape. Moreover, the lens surface may be a diffraction surface. The lens may be a refractive index-distributed lens (a GRIN lens) or a plastic lens.

In the variable magnification optical system, the aperture stop is arranged in the fourth lens group but may be arranged closest to an object in the fourth lens group. Further, the role of the aperture stop may be substituted by a lens frame without providing a member as the aperture stop.

An anti-reflection film having high transmittance in a wide wavelength range may be applied to a lens surface of a lens that constitutes the variable magnification optical system. Thereby, flare and ghosting are reduced, and it is possible to achieve high optical performance with a high contrast.

Next, an example of a camera including a variable magnification optical system is described with reference to FIG. 13.

Figure 13:
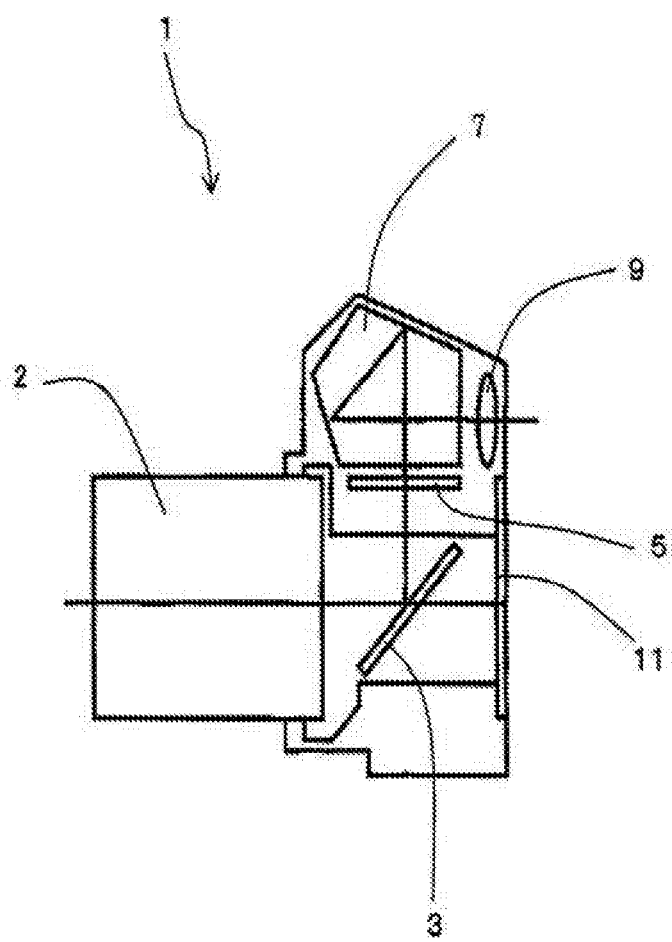
FIG. 13 is a cross-sectional view showing an outline of an example of an optical apparatus that includes a variable magnification optical system according to an embodiment.

FIG. 13 is a diagram showing a configuration of an example of a camera including a variable magnification optical system.

As shown in FIG. 13, a camera 1 is a digital single-lens reflex camera that includes the variable magnification optical system according to Example 1 described above as an image-capturing lens 2.

In the digital single-lens reflex camera 1 shown in FIG. 13, light from an object (subject) (not shown) is collected by the image-capturing lens 2 and is imaged on an imaging plate 5 via a quick return mirror 3. The light imaged on the imaging plate 5 is reflected a plurality of times in a pentagonal prism 7 and is guided to an eye lens 9. Thereby, a photographer can observe an object (subject) image via the eye lens 9 as an erect image.

When a release button (not shown) is pressed by the photographer, the quick return mirror 3 moves out of an optical path and the object (subject) light collected by the image-capturing lens 2 forms a subject image on an imaging element 11. Thereby, light from the object is imaged by the imaging element 11 and is stored in a memory (not shown) as an object image. In this way, the photographer can capture an image of the object using the camera 1.

The variable magnification optical system according to Example 1 described above mounted on the camera 1 as the image-capturing lens 2 is a variable magnification optical system having the focusing group (focusing lens group) which is made sufficiently lightweight. Accordingly, the camera 1 is a camera that has a high quietness at the time of autofocus. Further, since the focusing group can be made lightweight, the camera 1 can realize speed-up of autofocus without increasing the size of the lens barrel. The camera 1 can further realize a high optical performance in which that aberration variation when varying magnification from a wide-angle end state to a telephoto end state and aberration variation when focusing from an object at infinity to an object at a close distance are satisfactorily prevented. A camera on which the variable magnification optical system according to Example 2, Example 3, or Example 4 described above is mounted as the image-capturing lens 2 can also provide the same effects as the camera 1 described above. Further, the camera 1 may hold the image-capturing lens 2 in a detachable manner and may be formed integrally with the image-capturing lens 2. Furthermore, the camera 1 may be a camera which does not have a quick return mirror and the like.

Figure 14:
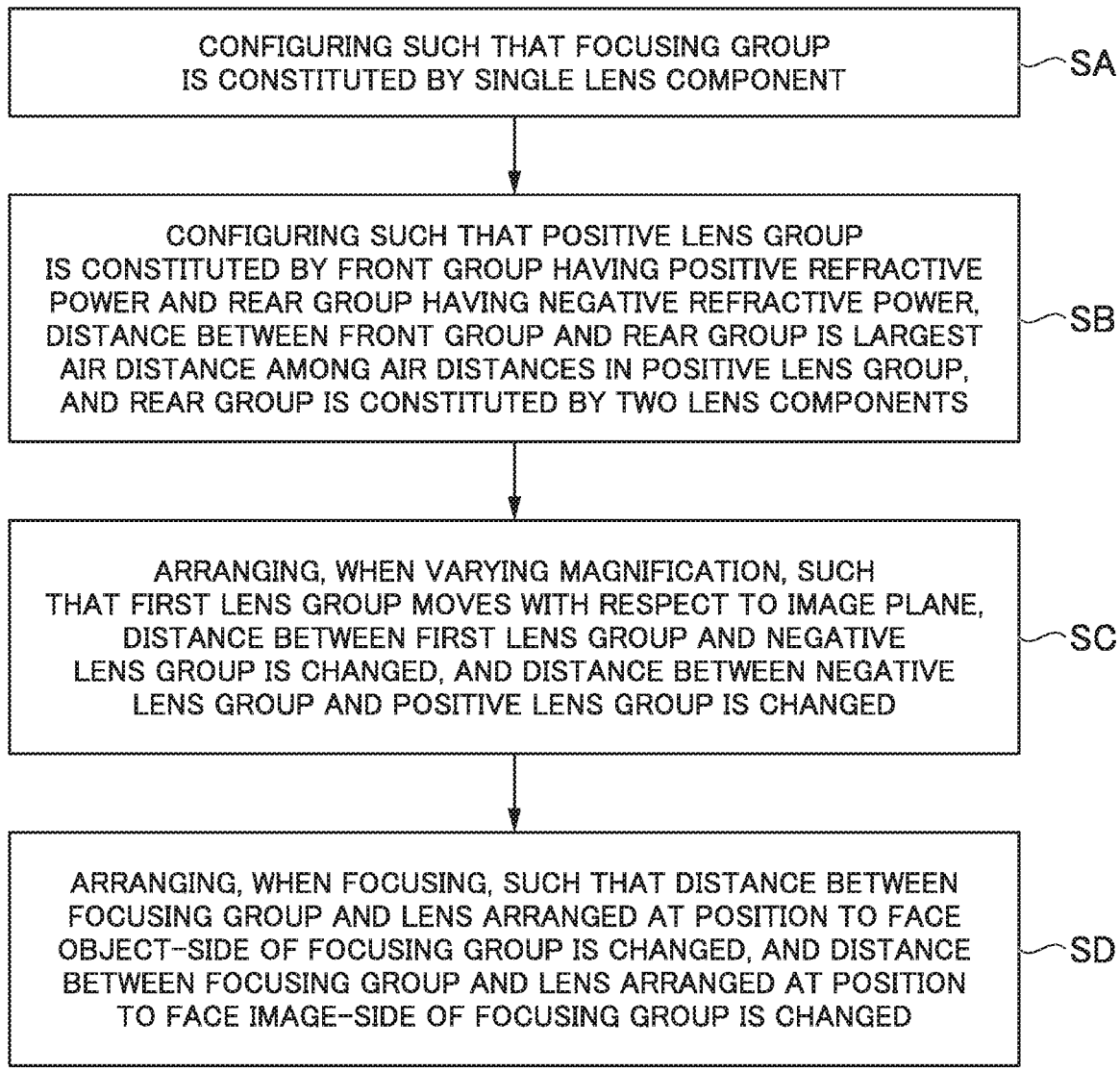
FIG. 14 is a view showing an outline of an example of a variable magnification optical system manufacturing method according to an embodiment.

Next, an example of a variable magnification optical system manufacturing method is described. FIG. 14 and FIG. 15 are views showing an outline of an example of a variable magnification optical system manufacturing method.

In an example shown in FIG. 14, a variable magnification optical system manufacturing method is a manufacturing method of a variable magnification optical system, including: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, the method including the following steps SA to SD:

step SA: configuring such that the focusing group is constituted by a single lens component;

step SB: configuring such that the positive lens group is constituted by a front group having a positive refractive power and a rear group having a negative refractive power, the distance between the front group and the rear group is the largest air distance among air distances in the positive lens group, and the rear group is constituted by two lens components;

step SC: arranging, when varying magnification, such that the first lens group moves with respect to an image plane, the distance between the first lens group and the negative lens group is changed, and the distance between the negative lens group and the positive lens group is changed; and step SD: arranging, when focusing, such that the distance between the focusing group and a lens arranged at a position to face an object-side of the focusing group is changed, and the distance between the focusing group and a lens arranged at a position to face an image-side of the focusing group is changed.

In an example shown in FIG. 15, an optical system manufacturing method is a manufacturing method of a variable magnification optical system, including: in order from an object along an optical axis, a first lens group having a positive refractive power; a second lens group having a negative refractive power; a third lens group having a positive refractive power; and a fourth lens group having a positive refractive power, the method including the following steps S1 to S4 as shown in FIG. 14:

step S1: configuring such that the third lens group is constituted by a single lens component;

step S2: configuring such that the fourth lens group is constituted by a front group having a positive refractive power and a rear group having a negative refractive power, configuring such that the distance between the front group and the rear group is the largest air distance among air distances in the fourth lens group, and configuring such that the rear group is constituted by two lens components;

step S3: configuring such that when varying magnification, the distance between the first lens group and the second lens group is changed, the distance between the second lens group and the third lens group is changed, and the distance between the third lens group and the fourth lens group is changed; and step S4: configuring such that when focusing from an object at infinity to an object at a close distance, the third lens group moves.

According to the variable magnification optical system manufacturing method described above, it is possible to manufacture a variable magnification optical system in which the focusing group (focusing lens group) is made sufficiently lightweight. As a result, it is possible to realize a variable magnification optical system having a high quietness at the time of autofocus. Further, since the focusing group can be made lightweight, it is possible to realize speed-up of autofocus without increasing the size of the lens barrel. Furthermore, it is possible to realize a variable magnification optical system having a high optical performance in which aberration variation when varying magnification from a wide-angle end state to a telephoto end state and aberration variation when focusing from an object at infinity to an object at a close distance are satisfactorily prevented.

EXPLANATION OF NUMERALS AND CHARACTERS

GL first lens group
G2: second lens group (negative lens group)
G3: third lens group (focusing group)
G4: fourth lens group (positive lens group)
G4F: front group
G4R: rear group
S: aperture stop
I: image plane
1: optical apparatus
2: image-capturing lens
3: quick return mirror
5: imaging plate
7: pentagonal prism
9: eye lens
11: imaging element

The invention claimed is:

1. A variable magnification optical system, comprising:
a first lens group having a positive refractive power and arranged closest to an object;
a negative lens group having a negative refractive power and arranged closer to an image than the first lens group;
a positive lens group which has a positive refractive power, which includes at least one lens that moves integrally with an aperture stop, and which is arranged closer to the image than the negative lens group; and
a focusing group arranged between the negative lens group and the positive lens group,
wherein when varying magnification, the first lens group moves with respect to an image plane, a distance between the first lens group and the negative lens group is changed, and a distance between the negative lens group and the positive lens group is changed,
wherein when focusing, a distance between the focusing group and a lens arranged at a position to face an object-side of the focusing group is changed, and a distance between the focusing group and a lens arranged at a position to face an image-side of the focusing group is changed,
wherein the focusing group is constituted by a single lens component,
wherein the positive lens group is constituted by a front group having a positive refractive power and a rear group having a negative refractive power, and a distance between the front group and the rear group is the largest air distance among air distances in the positive lens group,
wherein the rear group is constituted by two lens components, and
wherein the following conditional expression is satisfied:

$$0.4 < fF/(-fR) < 0.9$$

where
fF: a focal length of the front group, and
fR: a focal length of the rear group.

2. The variable magnification optical system according to claim 1,
wherein when varying magnification from a wide-angle end state to a telephoto end state, the first lens group moves toward the object.

3. The variable magnification optical system according to claim 1, comprising:
in order from an object along an optical axis, the first lens group the negative lens group as a second lens group; the focusing group as a third lens group and having a positive refractive power; and the positive lens group as a fourth lens group,
wherein when varying magnification from a wide-angle end state to a telephoto end state, a distance between the first lens group and the second lens group is changed, a distance between the second lens group and the third lens group is changed, and a distance between the third lens group and the fourth lens group is increased.

4. The variable magnification optical system according to claim 1, comprising:
in order from an object along an optical axis, the first lens group; and the negative lens group as a second lens group,
wherein when varying magnification, a distance between the first lens group and the second lens group is changed, and
wherein the following conditional expression is satisfied:

$$3.5 < f1/(-f2) < 6.5$$

where
f1: a focal length of the first lens group, and
f2: a focal length of the second lens group.

5. The variable magnification optical system according to claim 1, comprising:
in order from an object along an optical axis, the first lens group; the negative lens group as a second lens group;

the focusing group as a third lens group and having a positive refractive power; and the positive lens group as a fourth lens group, wherein when varying magnification, a distance between the first lens group and the second lens group is changed, a distance between the second lens group and the third lens group is changed, and a distance between the third lens group and the fourth lens group is changed, and wherein the following conditional expression is satisfied:

$$1.7 < f4/f3 < 2.4$$

where f4: a focal length of the fourth lens group, and f3: a focal length of the third lens group.

6. The variable magnification optical system according to claim 1, comprising:

in order from an object along an optical axis, the first lens group; the negative lens group as a second lens group; and the focusing group as a third lens group and having a positive refractive power, wherein when varying magnification from a wide-angle end state to a telephoto end state, a distance between the first lens group and the second lens group is increased, and a distance between the second lens group and the third lens group is decreased.

7. The variable magnification optical system according to claim 1, wherein the front group has a cemented lens, the cemented lens is constituted by a lens component having a positive refractive power and a lens component having a negative refractive power, and the following conditional expression is satisfied:

$$0.70 < n1/n2 < 0.95$$

where n1: a refractive index of the lens component having a positive refractive power, and n2: a refractive index of the lens component having a negative refractive power.

8. The variable magnification optical system according to claim 1, wherein the front group has a cemented lens, the cemented lens is constituted by a lens component having a positive refractive power and a lens component having a negative refractive power, and the following conditional expression is satisfied:

$$1.7 < v1/v2 < 3.2$$

where v1: the Abbe number of the lens component having a positive refractive power, and v2: the Abbe number of the lens component having a negative refractive power.

9. The variable magnification optical system according to claim 1, comprising:

in order from an object along an optical axis, the first lens group; the negative lens group as a second lens group; the focusing group as a third lens group and having a positive refractive power; and the positive lens group as a fourth lens group, wherein when varying magnification, a distance between the first lens group and the second lens group is changed, a distance between the second lens group and the third lens group is changed, and a distance between the third lens group and the fourth lens group is changed, and wherein the following conditional expression is satisfied:

$$0.5 < L4a/L4 < 0.9$$

where

L4a: the largest distance among air distances in the fourth lens group, and

L4: the distance from a surface closest to the object to a surface closest to the image of the fourth lens group.

10. An optical apparatus, comprising a variable magnification optical system according to claim 1.

11. A variable magnification optical system, comprising:

in order from an object along an optical axis, a first lens group having a positive refractive power; a second lens group having a negative refractive power; a third lens group having a positive refractive power; and a fourth lens group having a positive refractive power, wherein when varying magnification, a distance between the first lens group and the second lens group is changed, a distance between the second lens group and the third lens group is changed, and a distance between the third lens group and the fourth lens group is changed, wherein when focusing from an object at infinity to an object at a close distance, the third lens group moves, wherein the third lens group is constituted by a single lens component, wherein the fourth lens group is constituted by a front group having a positive refractive power and a rear group having a negative refractive power, and a distance between the front group and the rear group is the largest air distance among air distances in the fourth lens group, wherein the rear group is constituted by two lens components, and wherein the following conditional expression is satisfied:

$$3.5 < f1/(-f2) < 6.5$$

where f1: a focal length of the first lens group, and f2: a focal length of the second lens group.

12. The variable magnification optical system according to claim 11, wherein when varying magnification from a wide-angle end state to a telephoto end state, the first lens group moves toward the object.

13. The variable magnification optical system according to claim 11, wherein the following conditional expression is satisfied:

$$0.4 < fF/(-fR) < 0.9$$

where fF: a focal length of the front group, and fR: a focal length of the rear group.

14. The variable magnification optical system according to claim 11, wherein the following conditional expression is satisfied:

$$1.7 < f4/f3 < 2.4$$

where f4: a focal length of the fourth lens group, and f3: a focal length of the third lens group.

15. The variable magnification optical system according to claim 11, wherein when varying magnification from a wide-angle end state to a telephoto end state, a distance between the first lens group and the second lens group is increased, and a distance between the second lens group and the third lens group is decreased.

16. The variable magnification optical system according to claim 11,
wherein the front group has a cemented lens, the cemented lens is constituted by a lens component having a positive refractive power and a lens component having a negative refractive power, and the following conditional expression is satisfied:

0.70<$n1/n2$<0.95 where
n1: a refractive index of the lens component having a positive refractive power, and
n2: a refractive index of the lens component having a negative refractive power.

17. The variable magnification optical system according to claim 11,
wherein the front group has a cemented lens, the cemented lens is constituted by a lens component having a positive refractive power and a lens component having a negative refractive power, and the following conditional expression is satisfied:

1.7<$v1/v2$<3.2 where
v1: the Abbe number of the lens component having a positive refractive power, and
v2: the Abbe number of the lens component having a negative refractive power.

18. The variable magnification optical system according to claim 11,
wherein the following conditional expression is satisfied:

0.5<$L4a/L4$<0.9 where
L4a: the largest distance among air distances in the fourth lens group, and
L4: the distance from a surface closest to the object to a surface closest to the image of the fourth lens group.

19. An optical apparatus, comprising
a variable magnification optical system according to claim 11.

20. A method for manufacturing a variable magnification optical system, the method comprising at least one of the following features (A) or (B),
the feature (A) including:
providing an arrangement of lens groups including a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group;
arranging such that, when varying magnification, the first lens group moves with respect to an image plane, a distance between the first lens group and the negative lens group is changed, and a distance between the negative lens group and the positive lens group is changed;
arranging such that, when focusing, a distance between the focusing group and a lens arranged at a position to face an object-side of the focusing group is changed, and a distance between the focusing group and a lens arranged at a position to face an image-side of the focusing group is changed;
configuring the focusing group to be constituted by a single lens component;
configuring the positive lens group to be constituted by a front group having a positive refractive power and a rear group having a negative refractive power, and such that a distance between the front group and the rear group is the largest air distance among air distances in the positive lens group,
configuring the rear group to be constituted by two lens components, and
satisfying the following conditional expression:

0.4<$fF/(-fR)$<0.9 where
fF is a focal length of the front group, and
fR is a focal length of the rear group;
the feature (B) including:
providing an arrangement of lens groups including, in order from an object along an optical axis, a first lens group having a positive refractive power; a second lens group having a negative refractive power; a third lens group having a positive refractive power; and a fourth lens group having a positive refractive power;
arranging such that, when varying magnification, a distance between the first lens group and the second lens group is changed, a distance between the second lens group and the third lens group is changed, and a distance between the third lens group and the fourth lens group is changed;
arranging such that, when focusing from an object at infinity to an object at a close distance, the third lens group moves;
configuring the third lens group to be constituted by a single lens component;
configuring the fourth lens group to be constituted by a front group having a positive refractive power and a rear group having a negative refractive power, and such that a distance between the front group and the rear group is the largest air distance among air distances in the fourth lens group;
configuring the rear group to be constituted by two lens components; and
satisfying the following conditional expression:

3.5<$f1/(-f2)$<6.5 where
f1 is the focal length of the first lens group, and
f2 is the focal length of the second lens group.

* * * * *